United States Patent
Peart

(10) Patent No.: US 7,117,243 B2
(45) Date of Patent: *Oct. 3, 2006

(54) METHODS FOR DISTRIBUTED PROGRAM EXECUTION WITH FILE-TYPE ASSOCIATION IN A CLIENT-SERVER NETWORK

(75) Inventor: Franklyn Peart, Davie, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 829 days.

This patent is subject to a terminal disclaimer.

(21) Appl. No.: 09/970,038

(22) Filed: Oct. 2, 2001

(65) Prior Publication Data

US 2003/0074393 A1 Apr. 17, 2003

(51) Int. Cl.
*G06F 15/16* (2006.01)
(52) U.S. Cl. .............. 709/203; 709/217; 345/594; 345/1.1; 719/325; 715/763; 715/813
(58) Field of Classification Search ............. 709/217, 709/203; 345/594, 763, 813; 719/325, 763
See application file for complete search history.

(56) References Cited

U.S. PATENT DOCUMENTS

| | | | | |
|---|---|---|---|---|
| 4,949,248 | A | 8/1990 | Caro | 364/200 |
| 5,204,947 | A | 4/1993 | Bernstein et al. | 395/157 |
| 5,265,239 | A | 11/1993 | Ardolino | 395/500 |
| 5,761,656 | A * | 6/1998 | Ben-Shachar | 707/4 |
| 5,764,908 | A | 6/1998 | Shoji et al. | 395/200.47 |
| 5,801,170 | A * | 9/1998 | Gaster et al. | 514/236.2 |
| 5,832,274 | A * | 11/1998 | Cutler et al. | 717/171 |
| 5,838,906 | A * | 11/1998 | Doyle et al. | 709/202 |
| 5,859,978 | A * | 1/1999 | Sonderegger et al. | 709/226 |
| 5,870,552 | A | 2/1999 | Dozier et al. | 395/200.49 |
| 5,896,533 | A | 4/1999 | Ramos et al. | 395/680 |
| 5,898,835 | A | 4/1999 | Truong | 395/200.47 |
| 5,903,727 | A | 5/1999 | Nielsen | 395/200.42 |

(Continued)

FOREIGN PATENT DOCUMENTS

WO   WO 01/38973 A2   5/2001

OTHER PUBLICATIONS

U.S. Appl. No. 09/970,037, filed Oct. 2, 2001, Peart.

(Continued)

*Primary Examiner*—Thong Vu
*Assistant Examiner*—Hai V. Nguyen
(74) *Attorney, Agent, or Firm*—John D Lanza; Choate, Hall & Stewart LLP

(57) ABSTRACT

The present invention relates to a method for enabling distributed execution of a program. In one aspect, the method includes the step of receiving a mapping specifying an association between a type of data file and an executable program for execution on a server. The method also includes the steps of presenting a graphical depiction of a data file stored on a client system and receiving a selection of the graphical depiction of the data file. The method further includes the steps of identifying an executable program associated with the type of the selected data file using the received mapping and sending a request to execute the identified executable program.

46 Claims, 17 Drawing Sheets

U.S. PATENT DOCUMENTS

| | | | |
|---|---|---|---|
| 6,026,433 A | 2/2000 | D'Arlach et al. | 709/217 |
| 6,038,596 A | 3/2000 | Baldwin et al. | 709/219 |
| 6,047,312 A * | 4/2000 | Brooks et al. | 709/203 |
| 6,088,515 A | 7/2000 | Muir et al. | 395/200.47 |
| 6,125,387 A | 9/2000 | Simonoff et al. | 709/218 |
| 6,128,642 A | 10/2000 | Doraswamy et al. | |
| 6,131,116 A | 10/2000 | Riggins et al. | 709/219 |
| 6,154,218 A * | 11/2000 | Murase et al. | 345/619 |
| 6,185,609 B1 | 2/2001 | Rangarajan et al. | 709/219 |
| 6,195,678 B1 | 2/2001 | Komuro | 709/202 |
| 6,256,662 B1 | 7/2001 | Lo et al. | 709/203 |
| 6,256,666 B1 | 7/2001 | Singhal | 709/217 |
| 6,263,363 B1 | 7/2001 | Rosenblatt et al. | 709/217 |
| 6,266,678 B1 | 7/2001 | McDevitt et al. | 707/201 |
| 6,362,836 B1 * | 3/2002 | Shaw et al. | 715/744 |
| 6,421,673 B1 * | 7/2002 | Caldwell et al. | 707/10 |
| 6,442,565 B1 * | 8/2002 | Tyra et al. | 707/102 |
| 6,502,133 B1 * | 12/2002 | Baulier et al. | 709/224 |
| 6,721,803 B1 * | 4/2004 | Kirkeby | 709/246 |
| 6,779,117 B1 * | 8/2004 | Wells | 713/200 |
| 2001/0007995 A1 | 7/2001 | Makino | 709/219 |

OTHER PUBLICATIONS

U.S. Appl. No. 09/970,462, filed Oct. 2, 2001, Peart et al.

Anonymous. "Tarantella Web-enabling Software, One World, One Network, One Answer, An SCO Technical White Paper" Santa Cruz Operation, Inc. Dec. 31, 1999, pp. 1-25.

Anonymous. "Tarantella Administration Guide > Reference > Objects and attributes: Windows Application Object" The Santa Cruz Operation, Inc. 1999, pp. 1-4.

Anonymous. "Tarantella Administration Guide > Introduction > Essential information for Tarantella Administrators: Giving users access to applications and documents" The Santa Cruz Operation, Inc. 1999, pp. 1-3.

Anonymous. "Tarantella Administration Guide > Reference > Load balancing with arrays: Multiple application servers" The Santa Cruz Operation, Inc. 1999, pp. 1-2.

International Search Report from PCT/US02/31261, mailed Jun. 7, 2004.

European Patent Office, Decision to Refuse a European Patent application, Apr. 18, 2006 (15 pages).

* cited by examiner

METHODS FOR DISTRIBUTED PROGRAM EXECUTION WITH FILE-TYPE ASSOCIATION IN A CLIENT-SERVER NETWORK

FIELD OF THE INVENTION

The present invention relates generally to distributed program execution in client-server networks. In particular, the present invention relates to methods for automatically executing a program associated with a data file when the data file and the executable program are located on different computing nodes.

BACKGROUND OF THE INVENTION

In desktop computers employing command-line based operating systems, such as DISK OPERATING SYSTEM (DOS) from Microsoft Corporation of Redmond, Wash. or UNIX from AT&T Corporation of New York, N.Y., initiating the execution of a computer program required a user to enter the path and filename of the executable program at a command prompt. In response, the operating system attempted to execute the specified file. The user also entered one or more "arguments" after the path and filename that provided additional information that controlled the execution of the executable program. For example, typical arguments affected program operation and included the names of data files that the program would process. If an argument specified a data file for processing—for example, a spreadsheet—whose contents were not supported by the executable program—e.g., a word processor—the result ranged from system failure to a scrambled display. This problem also existed between similar software sold by different vendors: a word processor from one vendor typically was incapable of reading the files associated with another vendor's word processor.

One solution to this problem involved a voluntary naming convention: filenames ended in a period and an extension that specified their contents. However, nothing ensured that different vendors would not adopt the same file extension, that the filename extension was correct, or that the contents of the file were accurately specified by the extension. Moreover, nothing ensured that a user, confronted with a file with an unfamiliar extension, would utilize the correct executable program to access the contents of the file, assuming the user had the appropriate executable program to begin with.

The MACINTOSH OPERATING SYSTEM (MacOS) from Apple Computer of Cupertino, Calif. introduced one solution to this problem for desktop computers. Each file stored on a computer running MacOS had a file type and a creator identifier associated with it. Each executable file under MacOS had a special file type indicating that the file was executable and an associated creator identifier that matched the creator identifier of the files it was capable of editing. To edit a data file, a user selected a graphical depiction of the data file, which automatically initiated execution of an associated executable program sharing the creator identifier of the data file. If the computer lacked an executable program with a creator identifier matching that of the selected data file, the user was presented with a dialog informing her of that fact.

Moving beyond the desktop, contemporary computer networks consist of a number of computer systems, called nodes, communicating with other computer systems via communications links. Typically, some of the nodes are client nodes and other nodes are server nodes. A client node formulates and delivers queries to a server node. A user of the client node enters the queries through a user interface operating on the client node. The server node evaluates the queries and delivers responses to the client node for display on the client user interface.

Usually, the server nodes host a variety of application programs that are accessed and executed by client nodes. When a client node launches an application program, the execution of that application program occurs at either the client node or the server node, depending upon the computing model followed by the computer network. In a server-based computing model, the server node executes the application program, and only the control information for the client user interface is transmitted across the computer network for the client node for display. In a client-based computing model, the server node transmits the application program to the client node so that the client node executes the program using the resources of the client node.

Users of contemporary computer networks desire functionality similar to that provided on desktop computers by MacOS and members of the WINDOWS family of operating systems offered by Microsoft Corporation of Redmond, Wash. However, in a client-server network the executable program, the data file, and the user's virtual desktop may all be present on different computers. In this case, selection of the data file will typically invoke the operating system functionality described above, attempting to initiate the execution of an executable program on the same computer as the data file. For several reasons, this is not likely the behavior desired by the user: the computer storing the data file may not have the desired application; the computer storing the data file may be shared, subjecting other users to significant performance degradation when executing executable programs, etc. Therefore, it is desirable to provide apparatus and methods that facilitate distributed program execution, whereby selecting a data file or a representation thereof on one computer initiates the execution of an associated executable program on another computer.

SUMMARY OF THE INVENTION

The present invention relates to a method for enabling distributed execution of a program. In one aspect, the method includes the step of receiving a mapping specifying an association between a type of data file and an executable program for execution on a server. The method also includes the steps of presenting a graphical depiction of a data file stored on a client system and receiving a selection of the graphical depiction of the data file. The method further includes the steps of identifying an executable program associated with the type of the selected data file using the received mapping and sending a request to execute the identified executable program.

In one embodiment, the mapping includes information related to the type of data, a program to connect with a server, an executable program for processing data, and other parameters as input for the executable program. In another embodiment, the mapping may be updated periodically on a timely basis. In yet another embodiment, a file at the client system is modified to include the received mapping. The client, from the mapping, may identify the executable program and its location and may send a request to the identified server or servers to execute the program.

In another aspect, a method for enabling distributed program execution includes providing a mapping specifying an association between a type of data file and an executable program for execution on a server system. The data file is stored on the client system. The method also includes the steps of receiving a request to execute the executable program and executing the executable program on a server.

BRIEF DESCRIPTION OF THE DRAWINGS

The invention is pointed out with particularity in the appended claims. The above and further advantages of the invention may be better understood by referring to the following description and the accompanying drawings, in which:

In the drawings, like reference characters generally refer to the same parts throughout the different views. The drawings are not necessarily to scale, emphasis instead being placed upon illustrating the principles of the invention.

DETAILED DESCRIPTION OF THE INVENTION

Figure 1:
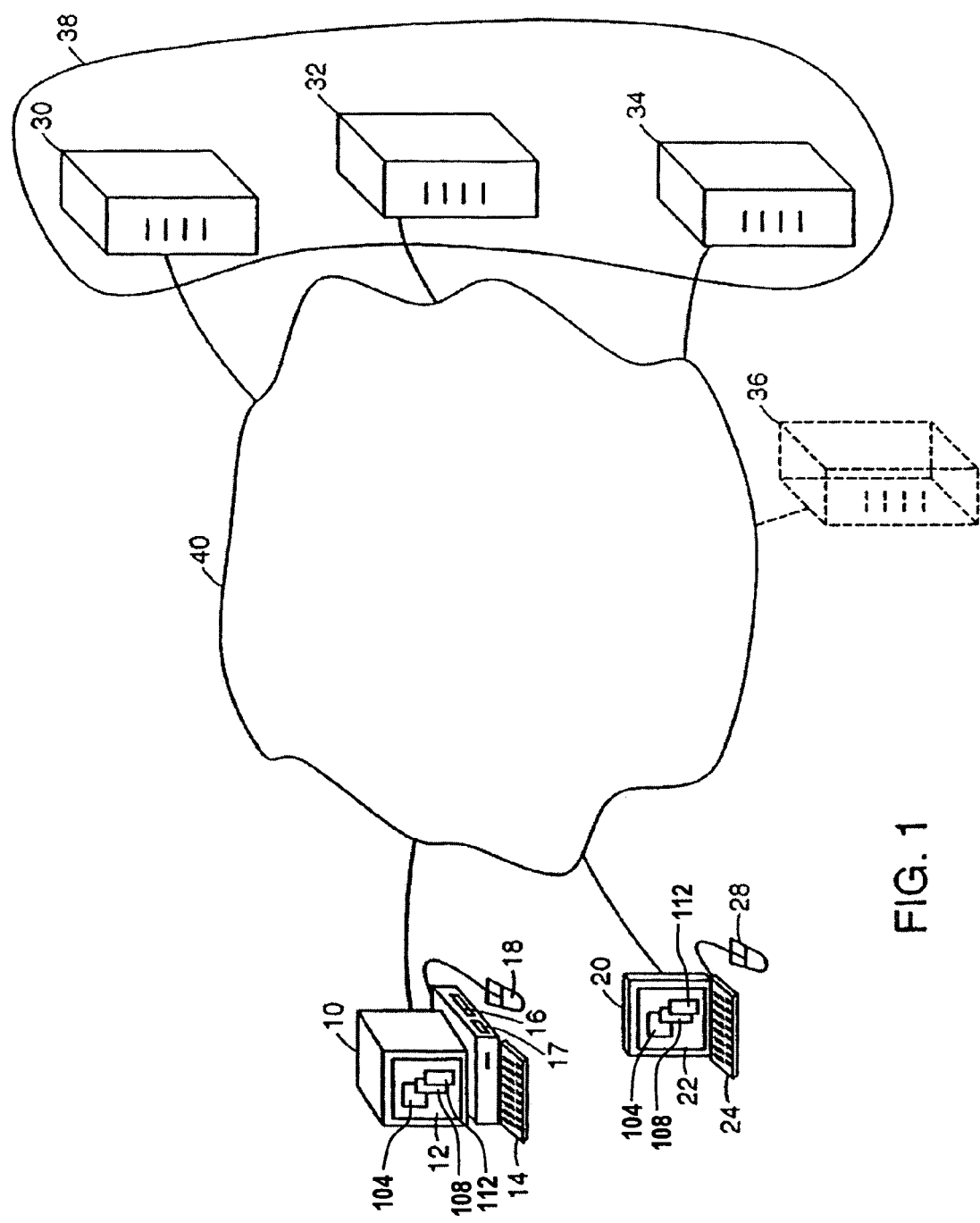
FIG. 1 is a diagram of an embodiment of client nodes in communications with a group of server nodes via a network, wherein a program neighborhood of a client node can be determined.

FIG. 1 shows a first computing system (client node) 10 and a second computing system (client node) 20 in communication with computing systems (application servers) 30, 32, 34, and 36 over a network 40. The network 40 can be a local-area network (LAN) or a wide area network (WAN) such as the Internet or the World Wide Web. Users of the client nodes 10, 20 can be connected to the network 40 through a variety of connections including standard telephone lines, LAN or WAN links (e.g., T1, T3, 56 kb, X.25), broadband connections (ISDN, Frame Relay, ATM), and wireless connections. The connections can be established using a variety of communication protocols (e.g., TCP/IP, IPX, SPX, NetBIOS, Ethernet, RS232, and direct asynchronous connections).

In one embodiment, the client node 10 is a personal computer (e.g. using a microprocessor from the x86, 680x0, PowerPC, PA-RISC, or MIPS processor families), smart or dumb terminal, network computer, wireless device, information appliance, workstation, minicomputer, mainframe computer or other computing device that has a graphical user interface and sufficient persistent storage to execute application programs downloaded from application servers 30, 32, 34 over the network 40. Operating systems supported by the client node 10 can include any member of the WINDOWS family of operating systems, MacOS, JavaOS, and various varieties of Unix (e.g., Solaris, SunOS, Linux, HP-UX, A/IX, and BSD-based distributions). The client node 10 can include a display 12, a keyboard 14, a memory 16 for storing downloaded application programs, a processor 17, and a mouse 18. The memory 16 can provide persistent or volatile storage.

The processor 17 can execute the application programs locally on the client node 10 and display a resulting windows-based desktop on the display screen 12. Such local processing on the client node 10 is according to the above-described client-based computing model. A typical windows-based desktop appearing on one embodiment of the client node 10 is depicted in FIG. 1. The resources available to the client node 20 are presented graphically as one or more icons. Memory 16 is presented as a hard disk icon 104. The downloaded application programs and data files stored on memory 16 are presented as individual file icons. For example, memory 16 contains a downloaded application program implementing a word processor, illustrated as icon 108, and a data file containing a document adapted for processing by the word processor program, illustrated as icon 112.

The user typically manipulates the desktop using keyboard 14, mouse 18, or some other input device such as a haptic interface (not shown). Using the input device, the user invokes the execution of the word processor program by selecting icon 108. Using the word processor program, the user manipulates the contents of the data file containing the document represented by icon 112. However, it is more likely that the user will eschew locating and activating the word processor program in favor of selecting the data file itself. As described above, most modem operating systems with graphical user interfaces will examine the selected data file, retrieve one or more parameters associated with the selected data file, identify an executable application program on the desktop computer associated with the selected data file, begin execution of the associated application program, and then provide the contents of the selected data file to the associated application program for processing.

In other embodiments, the client node 20 is any terminal (windows or non-windows based), or thin-client device operating according to a server-based computing model. In a server-based computing model, the execution of application programs occurs entirely on the application servers 30, 32, 34, and the user interface, keystrokes, and mouse movements are transmitted over the network 40 to the client node 20. The user interface can be text driven (e.g., DOS) or graphically driven (e.g., WINDOWS). Platforms supported by the client node 20 include DOS and WINDOWS CE for windows-based terminals. The client node 20 includes a display screen 22, a keyboard 24, a mouse 28, a processor (not shown), and persistent storage (not shown).

The application servers 30, 32, 34, and 36 are any computing device that controls access to other portions of the network (e.g., workstations, printers). Four application servers are depicted for convenience of discussion; it is to be understood that more or fewer application servers are connected to the network 40 in various embodiments of the present invention. The servers 30, 32, 34, and 36 operate according to a client-based computing model or a server-based computing model as described above.

Each application server 30, 32, 34, and 36 hosts one or more application programs that for access by the client nodes 10 and 20. Applications made available to client nodes for use are referred to as published applications. Examples of such applications include word processing programs such as WORD and spreadsheet programs such as EXCEL, both offered by Microsoft Corporation of Redmond, Wash., financial reporting programs, customer registration programs, technical support programs, customer database programs, or application set managers.

In one embodiment, the servers 30, 32, and 34 belong to the same domain 38. In the network 40, a domain is a sub-network comprising a group of application servers and client nodes under the control of one security database. In one embodiment, a domain includes one or more "server farms," i.e., a group of servers that are linked together to act as a single server system to provide centralized administration. Conversely, a server farm can include one or more domains. For servers of two different domains to belong to the same server farm, a trust relationship may need to exist between the domains specifying an association between the different domains that allows a user to access the resources associated with each domain using a single authentication credential.

In one embodiment, the application server 36 is in a different domain than the domain 38. In another embodiment, the application server 36 is in the same domain as servers 30, 32, and 34. In either embodiment, application servers 30, 32, and 34 can belong to one server farm, while the server 36 belongs to another server farm, or all of the application servers 30, 32, 34, and 36 can belong to the same server farm. When a new server is connected to the network 40, the new server either joins an existing server farm or starts a new server farm.

In one embodiment, the network 40 includes a master server node for performing load-level balancing among the application servers 30, 32, 34, and 36. In another embodiment, the master server node is one of the application servers 30, 32, 34, or 36. The master server node includes a list of server addresses and load information corresponding to each of the other application servers. Using the list of available servers and their corresponding load levels, the master server node directs the client node to a particular server node on which to execute an application based on the list of available servers and corresponding load levels. Alternatively, the application servers 30, 32, 34, 36 collaborate among themselves in a peer-to-peer fashion to exchange administration information such as load levels, allowing any server 30, 32, 34, 36 to respond to a request made by a client node 10, 20.

Program Neighborhood

According to the principles of the invention, a user of either client node 10, 20 learns of the availability of application programs hosted by the application servers 30, 32, 34, and 36 in the network 40 without requiring the user to know where to find such applications or to enter technical information necessary to link to such applications. These available application programs comprise the "program neighborhood" of the user. A system for determining a program neighborhood for a client node includes an application program (hereafter referred to as the "Program Neighborhood" application), memory for storing components of the application program, and a processor for executing the application program.

The Program Neighborhood application is installed in memory of the client node 10 and/or on the application servers 30, 32, 34, and 36 as described below. The Program Neighborhood application is a collection of services, application programming interfaces (APIs), and user interface (UI) programs that disclose to users of the client nodes 10, 20 those application programs hosted by the application servers that each client node is authorized to use (e.g., execute).

An application server operating according to the Program Neighborhood application collects application-related information from each of the application servers in a server farm. The application-related information for each hosted application includes but is not limited to the address of the server hosting that application, the application name, the users or groups of users who are authorized to use that application, the data types supported by the application, any file types associated with the supported data types, any file types associated with the application, conditional rules specifying the execution of the application either at a server node or at the client node, and the minimum capabilities required of the client node before establishing a connection to run the application. For example, the application may stream video data, and therefore a required minimum capability is that the client node supports video data. Other exemplary requirements are that the client node support audio data or encrypted data. The application-related information can be stored in a database as described below.

When a client node connects with the network 40, the user of the client node provides user credentials. User credentials typically include the user's name, password, and the domain name for which the user is authorized. The user's credentials are obtained from smart cards, time-based tokens, social security numbers, user passwords, personal identification (PIN) numbers, digital certificates based on symmetric key or elliptic curve cryptography, biometric characteristics of the user, or any other means by which the identification of the user of the client node is obtained and submitted for authentication.

The server responding to the client node authenticates the user based on the user credentials. In one embodiment, the user credentials are stored wherever the Program Neighborhood application is executing. For example, in one embodiment where the client node 10 executes the Program Neighborhood application, the user credentials are also stored at the client node 10. In another embodiment where an application server is executing the Program Neighborhood application, the user credentials are stored at that server.

From the user credentials and the application-related information, the server also determines which application programs hosted by the application servers are available for use by the user of the client node. The server transmits information representing the available application programs to the client node. This process eliminates the need for a user of the client node to set-up application connections. Also, an administrator of the server can control access to applications among the various client node users.

The user authentication performed by the server can suffice to authorize the use of each hosted application program presented to the client node, although such applications may reside at another server. Accordingly, when the client node initiates execution of one of the hosted applications, additional input of user credentials by the user may be unnecessary to authenticate use of that application. Thus, a single entry of the user credentials serves to determine the available applications and to authorize the launching of such applications without an additional, manual log-on authentication process by the client user.

Either a client node 10, 20 or an application server can launch the Program Neighborhood application as described in connection with FIGS. 2A–2C. The results are displayed on the display screen 12, 22 of the client node 10, 20. In a graphical environment, the results can be displayed in a Program Neighborhood graphical window and each authorized application program can be represented by a graphical icon in that window.

One embodiment of the Program Neighborhood application filters those application programs that the client node 10, 20 is unauthorized to use and displays only authorized (i.e., available) programs. In other embodiments, the Program Neighborhood application displays authorized and unauthorized applications. When unauthorized applications are not filtered from the display, a notice can be provided indicating that such applications are unavailable. Alternatively, the Program Neighborhood application can report all applications hosted by the application servers 30, 32, 34, 36 to the user of a client node, without identifying which applications the client node 10, 20 is authorized or unauthorized to execute. Authorization is subsequently determined when the client node 10, 20 attempts to run one of those applications.

Figure 2A:
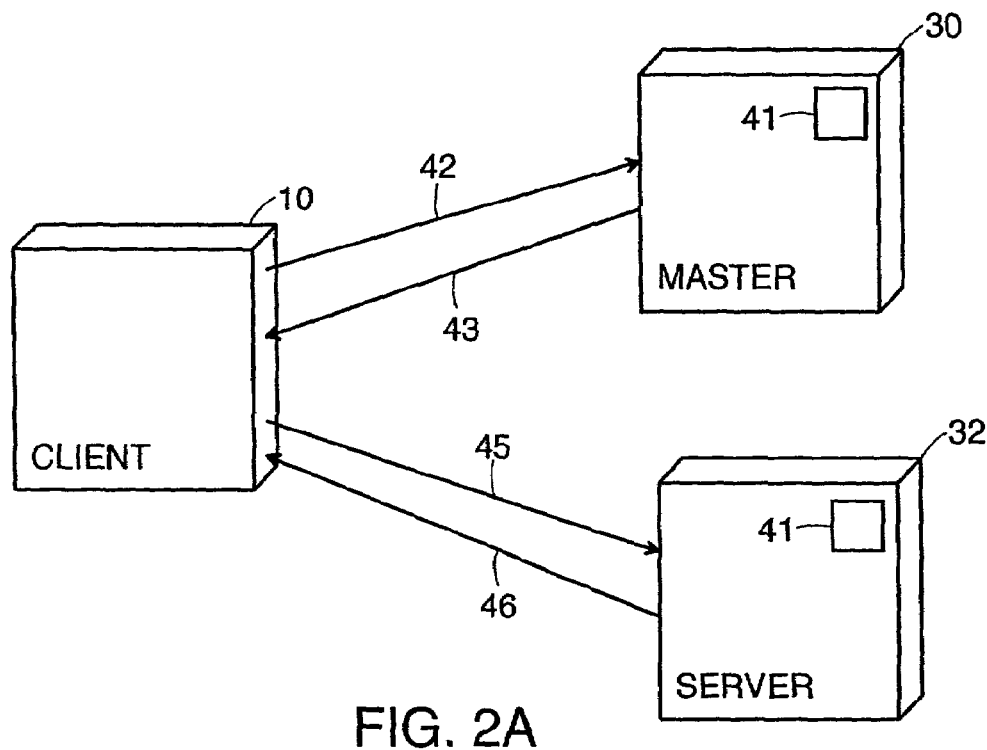
FIG. 2A is a block diagram illustrating an exemplary process by which one of the server nodes initiates execution of an application program for determining the program neighborhood of a client node.

FIG. 2A shows an exemplary process by which a server launches the Program Neighborhood (PN) application and presents results of the PN application to the client node 10. The server launches the PN application in response to a request 42 by the client node 10 for a particular application program. The request passes to the master server node, in this example server 30. The master server node 30, taking load-balancing and application availability into account, indicates (arrow 43) to the client node 10 that the sought-after application is available on server 32. The client node 10 and server 32 establish a connection (arrows 45 and 46). By this connection, the server 32 can transfer the executable code of the particular application to the client node 10, when the client node 10 and server 32 are operating according to the client-based computing model. Alternatively, the server 32 executes the particular application and transfers the graphical user interface to the client node 10, when the client node 10 and server 32 operate according to the server-based computing model. In addition, either the master server node 30 or the server 32 can execute the Program Neighborhood application 41 and push the results (arrows 43 or 46) back to the client node 10 so that when the client node 10 requests the Program Neighborhood application, the program neighborhood is already available at the client node 10.

Figure 2B:
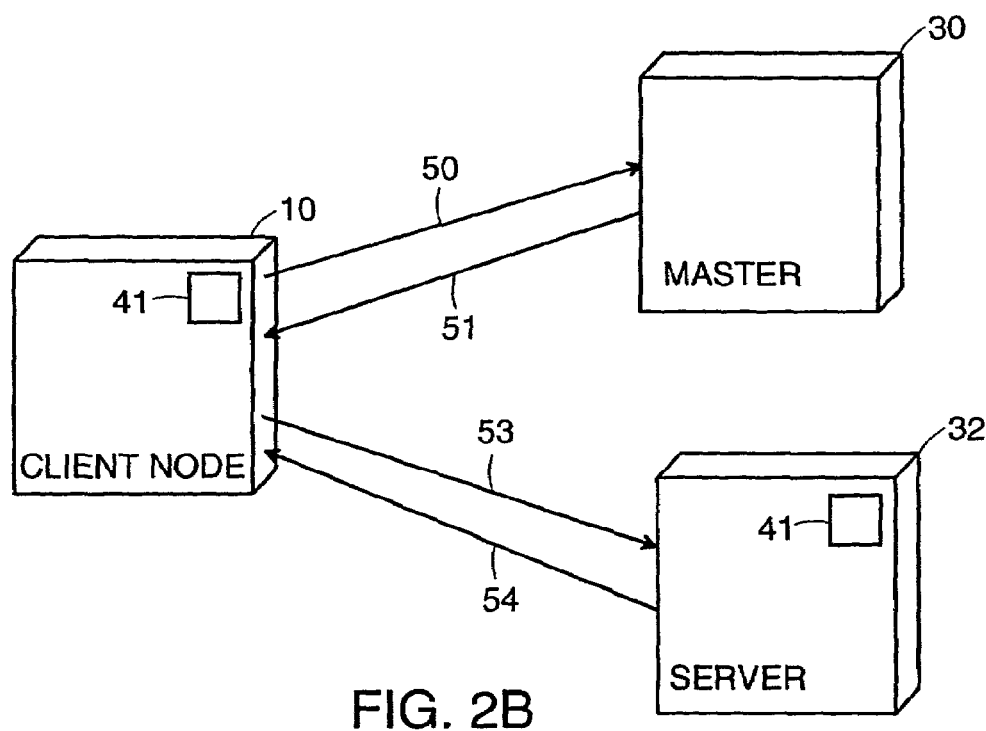
FIG. 2B is a block diagram illustrating an exemplary process by which a client node initiates execution of an application program for determining the program neighborhood of that client node.

FIG. 2B shows another exemplary process by which the client node 10 initiates execution of the Program Neighborhood application and a server presents the results of the PN application to the client node 10. The client node 10 launches the Program Neighborhood application (e.g., by selecting the Program Neighborhood icon 47 representing the application). The request 50 for the Program Neighborhood application is directed to the master server node, in this example server 30. The master server node 30 can execute the Program Neighborhood application if the application is on the master server node 30 and return the results to the client node 10. Alternatively, the master server node 30 can indicate (arrow 51) to the client node 10 that the Program Neighborhood application 41 is available on another server, in this example server 32. The client node 10 and server 32 establish a connection (arrows 53 and 54) by which the client node 10 requests execution of the Program Neighborhood application 41. The server 32 can execute the application 41 and transfer the results (i.e., the graphical user interface) to the client node 10.

Figure 2C:
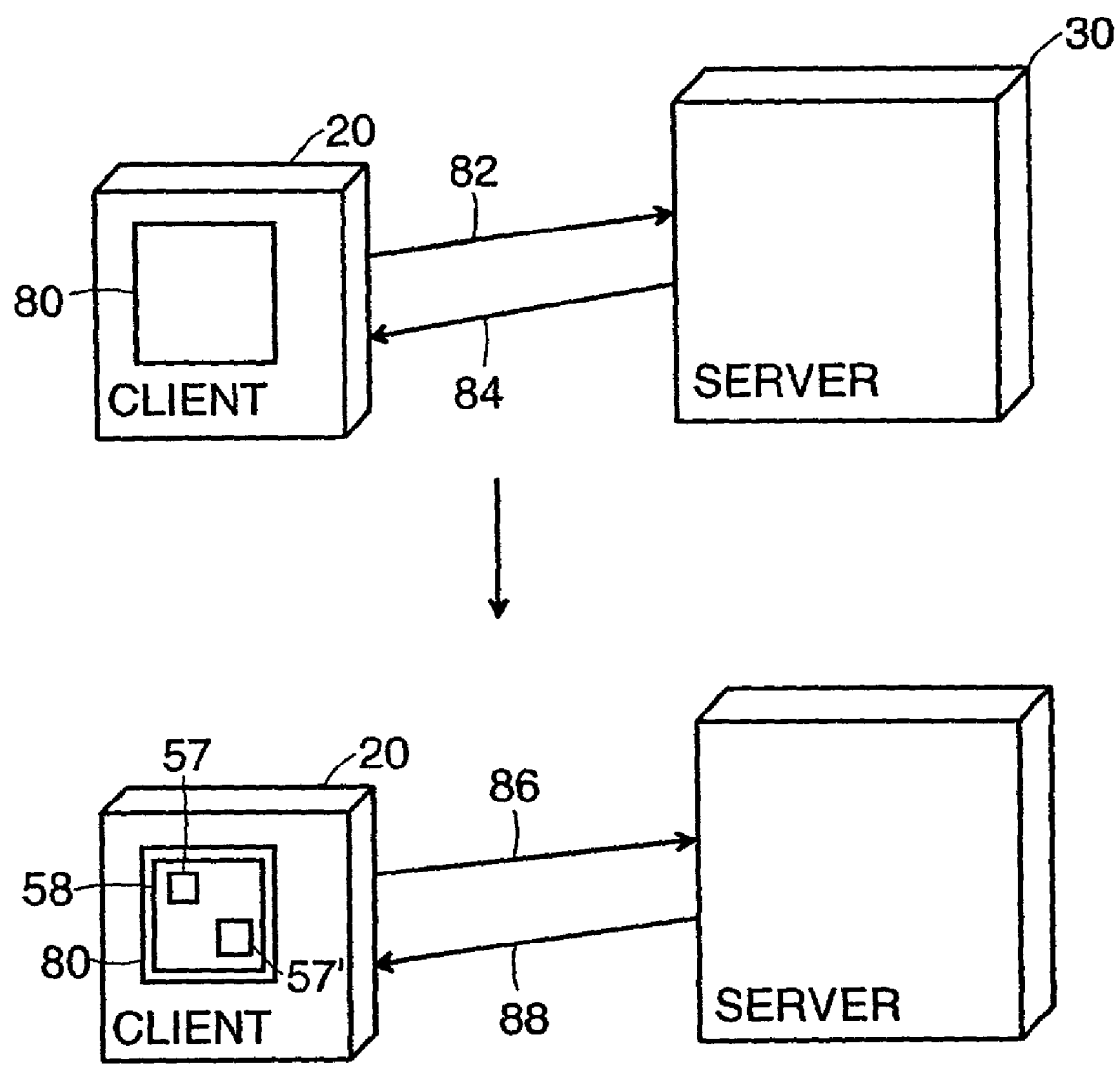
FIG. 2C is a block diagram illustrating an exemplary process by which a client node uses a web browser application to determine its program neighborhood.

FIG. 2C shows another exemplary process by which a client node 10 initiates execution of the Program Neighborhood application, in this example via the World Wide Web. A client node 20 executes a web browser application 80, such as INTERNET EXPLORER, manufactured by Microsoft Corporation of Redmond, Wash. The client node 20, via the web browser 80, transmits a request 82 to access a Uniform Resource Locator (URL) address corresponding to an HTML page residing on server 30. In some embodiments the first HTML page returned 84 to the client node 20 by the server 30 is an authentication page that seeks to identify the client node 20.

The authentication page allows the client node 20 to transmit user credentials via the web browser 80 to the server 30 for authentication. Transmitted user credentials are verified either by the server 30 or by another server in the farm. This allows a security domain to be projected onto the server 30. For example, if the server 30 runs the WINDOWS NT operating system and the authenticating server runs the UNIX operating system, the UNIX security domain may be said to have been projected onto the server 30. User credentials may be transmitted "in the clear," or they may be encrypted. For example, user credentials may be transmitted via a Secure Socket Layer (SSL) connection which encrypts data using the RC3 algorithm, manufactured by RSA Data Security, Inc. of San Mateo, Calif.

The server 30 may verify the user credentials received from the client node 20. Alternatively, the server 30 may pass the user credentials to another server for authentication. In this embodiment, the authenticating server may be in a different domain from the server 30. Authenticated user credentials of the client node 20 may be stored at the client node 20 in a per-session cookie, in fields that are not displayed by the web browser 80, or in any other manner common in maintenance of web pages. In some embodiments, a server farm with which the server 30 is associated may allow guest users, i.e., users that do not have assigned user credentials, to access applications hosted by servers in the farm. In these embodiments, the authentication page may provide a mechanism for allowing a client node 20 to identify that it is a guest user, such as a button or menu selection. In other embodiments, the server 30 may omit the authentication page entirely.

Still referring to FIG. 2C, once the client node 20 is authenticated by the server 30, the server prepares and transmits to the client node 20 an HTML page 88 that includes a Program Neighborhood window 58 in which appears graphical icons 57, 57' representing application programs to which the client node 20 has access. A user of client node 20 invokes execution of an application represented by icon 57 by selecting icon 57.

Figure 3A:
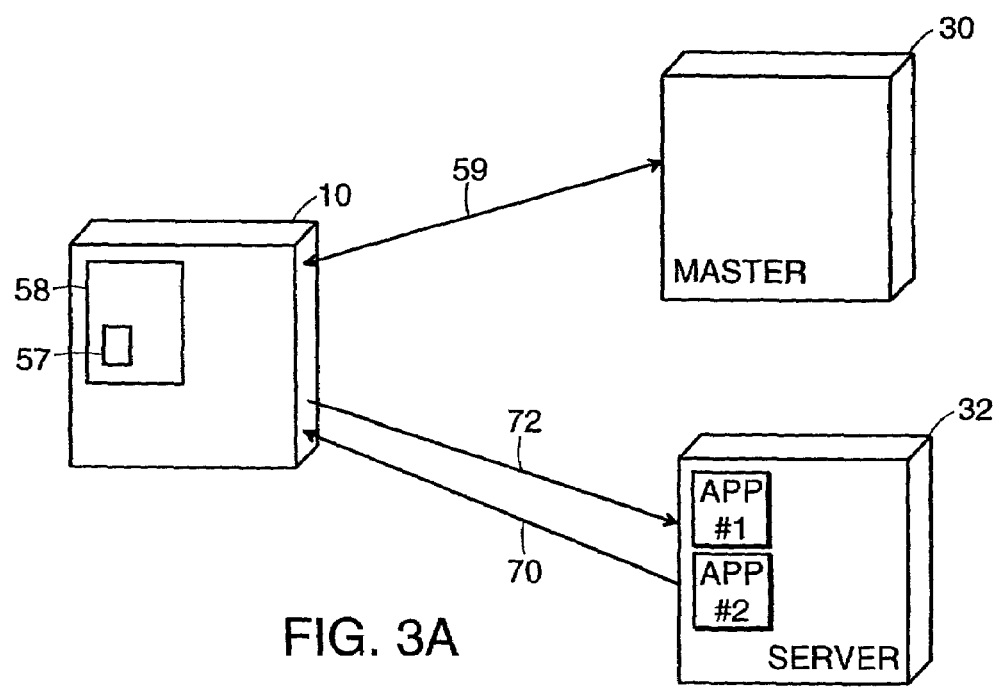
FIGS. 3A, 3B, and 3C are block diagrams illustrating exemplary processes by which a client node launches an application program from a Program Neighborhood window displayed at that client node.

FIG. 3A shows an exemplary process of communication among the client node 10, the master server node, in this example server 30, and the server 32. The client node 10 has an active connection 72 with the server 32. The client node 10 and server 32 can use the active connection 72 to exchange information regarding the execution of a first application program. The user credentials of the client node 10 are stored at the client node. Such storage of the user credentials can be in cache memory or persistent storage.

In this embodiment, the Program Neighborhood application runs on the client node 10. The client node display has a Program Neighborhood window 58 which presents a graphical icon 57 representing a second application program. A user of the client node 10 can launch the second application program by selecting the icon 57 with a mouse or other input device. The request passes to the master server node 30 via a connection 59. The master server node 30 indicates to the client node 10 via the connection 59 that the sought-after application is available on server 32. The client node 10 signals the server 32 to establish a second connection 70. The server 32 requests the user credentials from the client node 10 to authenticate access to the second application program. Upon a successful authentication, the client node 10 and server 32 establish the second connection 70 and exchange information regarding the execution of the second application program. Accordingly, the client node 10 and the server 32 communicate with each other over multiple connections.

Figure 3B:
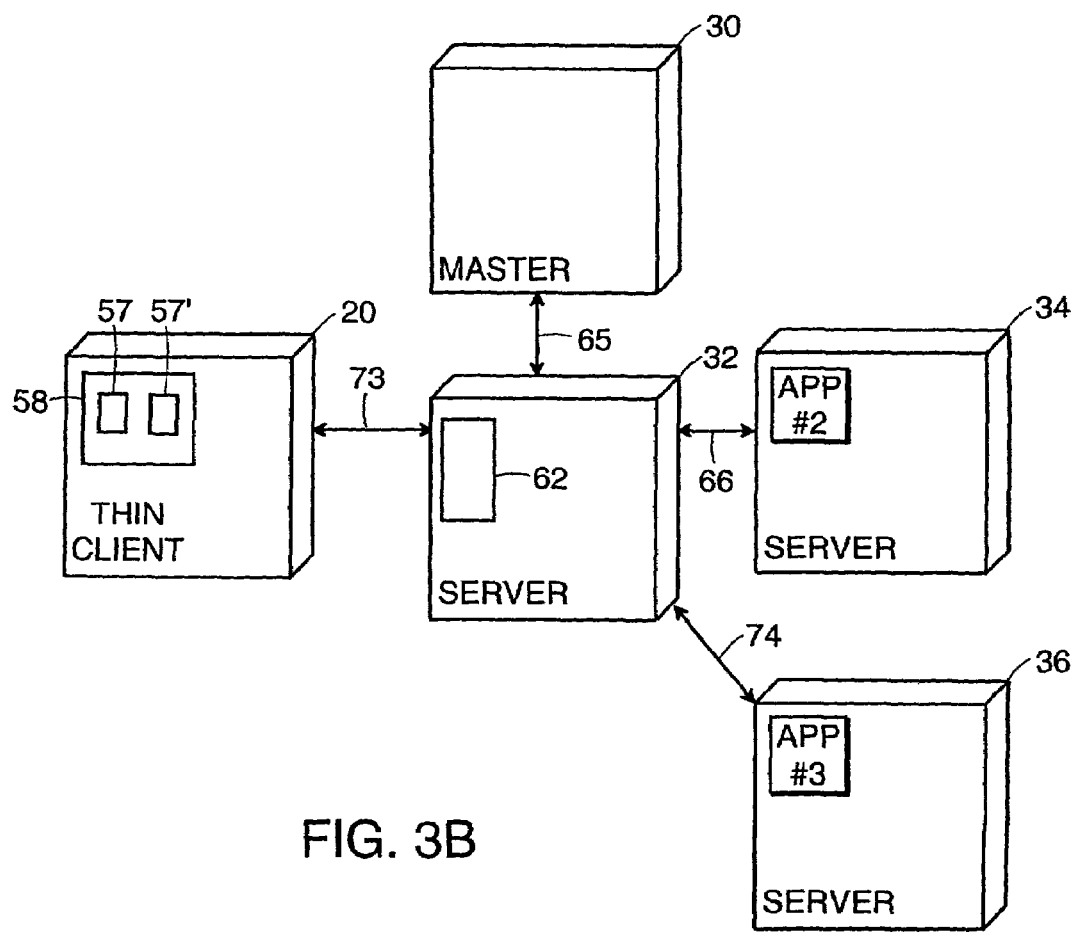

FIG. 3B shows an exemplary process of communication among the client node 20, the master server node, in this example server 30, and servers 32, 34, and 36. The client node 20 has an active connection 73 with the server 32. The client node 20 and server 32 can use the active connection 73 to exchange information regarding the execution of a first application program. The user credentials of the client node 20 are stored at the server 32 in cache memory or in persistent storage.

In this embodiment, the Program Neighborhood application runs on the server 32. The server 32 includes software providing a server-based client engine 62, enabling the server 32 to operate in the capacity of the client node 20. The client node 20 display has a Program Neighborhood window 58 in which appears graphical icons 57, 57' representing a second application program and a third application program, respectively. A user of the client node 20 can launch the second application program by selecting the icon 57. The request to launch the second application program passes to the server 32 via active connection 73, and the server 32 forwards the request to the master server node 30 (arrow 65).

The master server node 30 indicates (arrow 65) to the server 32 that the sought-after application is available on server 34. The server 32 contacts the server 34 to establish a connection 66. To authenticate access to the application, the server 34 obtains the user credentials of the client node 20 from the server 32. The server 32 and server 34 establish the connection (arrow 66) by which the server 32 requests execution of the second application and the server 34 returns the graphical user interface results to the server 32. The server 32 forwards the graphical user interface results to the client node 20, where the results are displayed. Accordingly, the information exchanged between the client node 20 and the server 34 passes through the server 32.

Similarly, the client node 20 can launch the third application program by selecting the icon 57'. The request to launch the third application program passes to the server 32. The server 32 forwards the request to the master server node 30, which considers load-balancing and application program availability to determine which server can handle the request. In this example, the master server node indicates that server 36 can run the third application program.

The server 32 and server 36 establish a connection (arrow 74) by which the server 32 requests execution of the third application program, and the server 36 returns the results to the server 32. To permit execution of the third application program, the server 36 can authenticate the user credentials of the client node 20, which are obtained from the server 32. The server 32 forwards the results to the client node 20 where the results are displayed. Accordingly, the results of executing the third application program pass between the client node 20 and the server 36 through the server 32.

From this illustration it should be understood that client node 20 can run multiple application programs through one connection with the server 32, while the server 32 maintains multiple connections (in this example, one connection with server 34 and a second connection with server 36). Also, the server 32 merges the information received from the server 34 with the information received from the server 36 into one data stream for transmission to the client node 20.

Figure 3C:
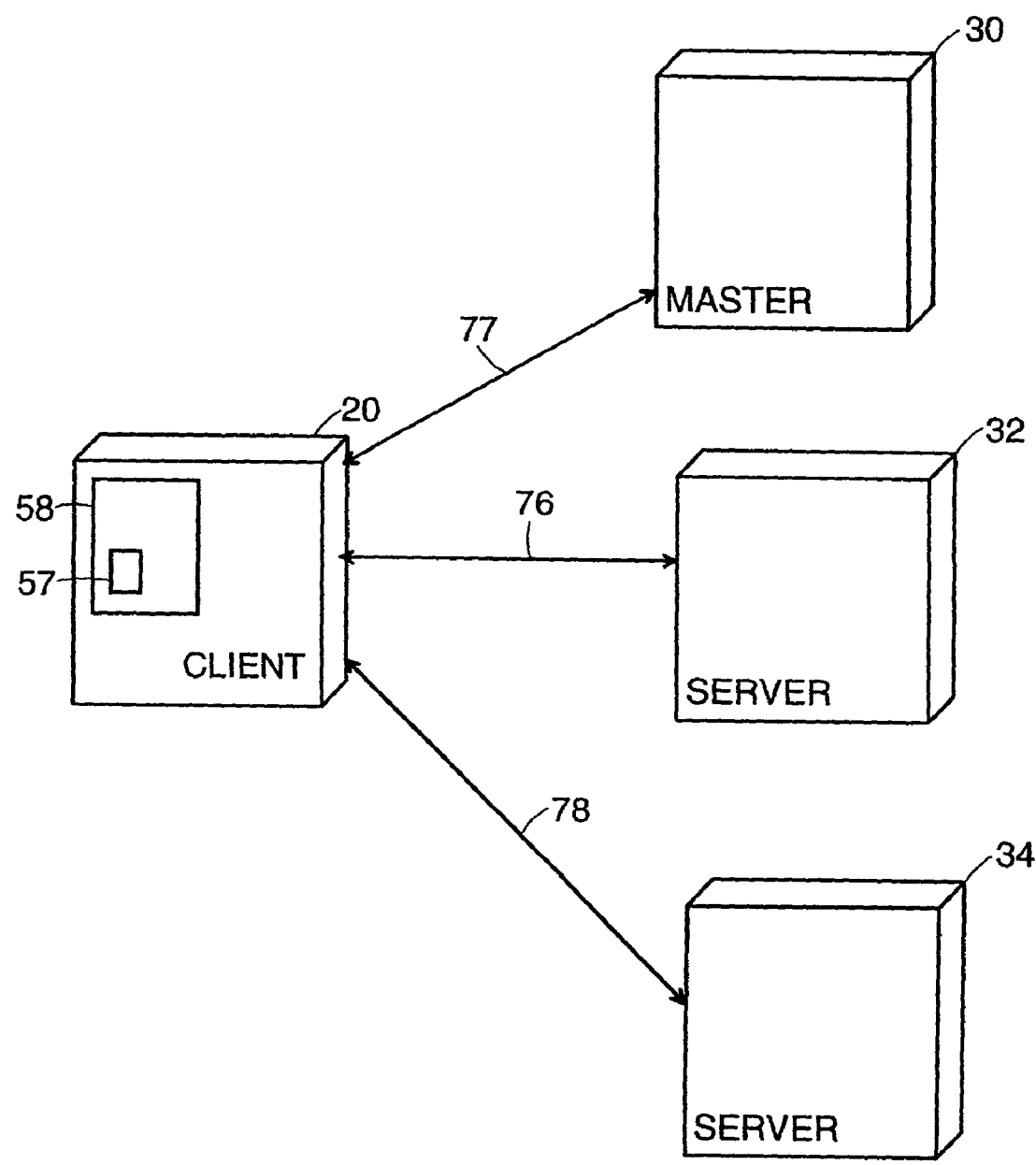

FIG. 3C shows an exemplary process of communication among the client node 20, the master server node, in this example server 30, and servers 32 and 34. The client node 20 has an active connection 76 with the server 32. The client node 20 and server 32 can use the active connection 76 to exchange information regarding the execution of a first application program. The client node 20 can store the user credentials in cache memory or in persistent storage.

In this embodiment, the Program Neighborhood application runs on the server 32. The client node 20 display has a Program Neighborhood window 58 in which appears a graphical icon 57 representing a second application program. A user of the client node 20 can launch the second application program by selecting the icon 57. The request to launch the second application program passes to the server 32. The server 32 responds (i.e., "calls back") to the client node 20 by returning application-related information such as the name of the application and capabilities needed by the client node 20 for the second application to run.

With the information provided by the server 32, the client node 20 then communicates with the master server node 30 via connection 77 to determine the server for executing the second application program. In this example, that server is server 34. The client node 20 then establishes a connection 78 to the server 34. Server 34 requests the user credentials from the client node 20 to authenticate the user of the client node 20. The second application program executes on the server 34, and the server 34 returns the graphical user interface to the client node 20 via the established connection 78. Accordingly, the client node 20 can have multiple active connections between the multiple servers.

Figure 3D:
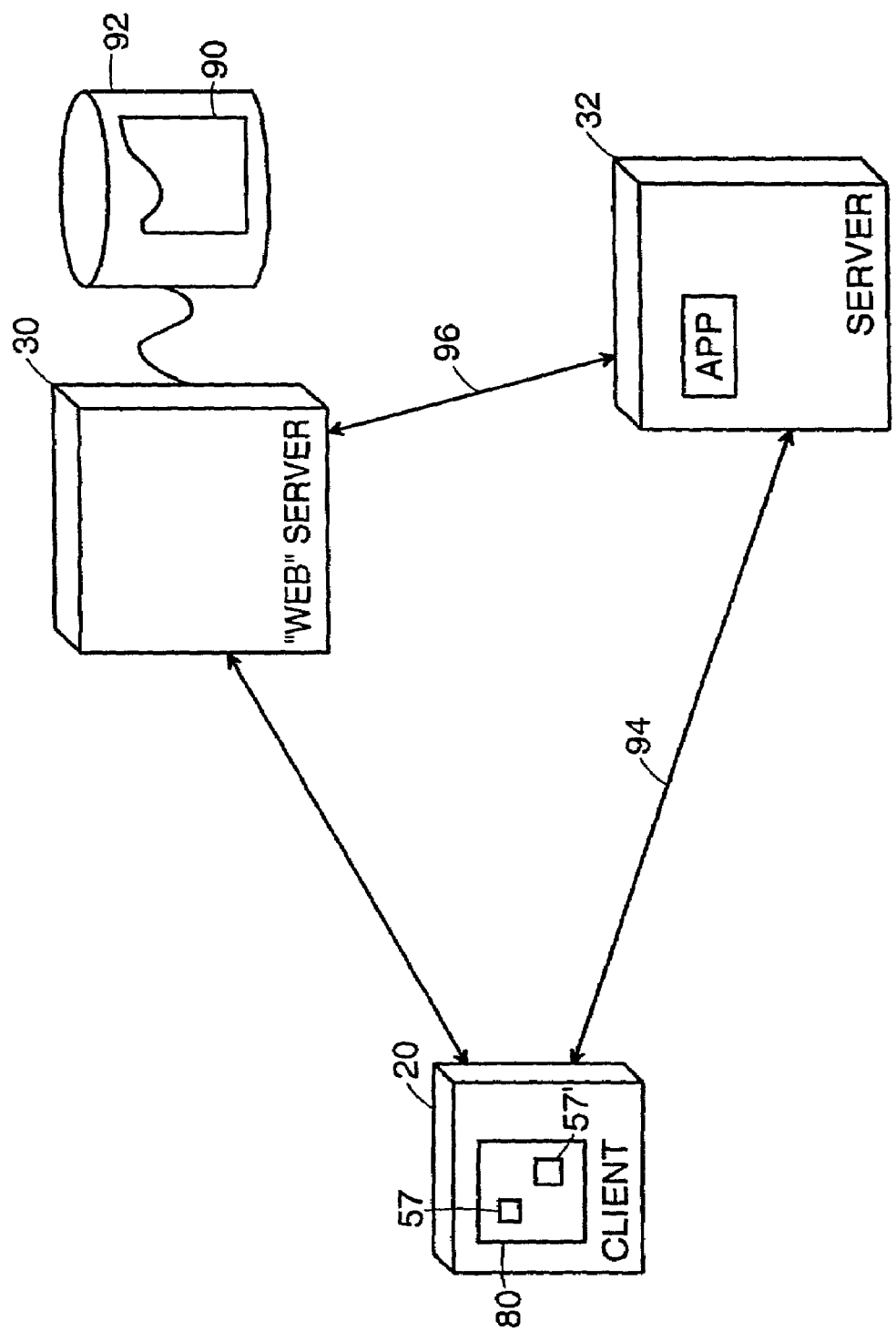
FIG. 3D is a block diagram illustrating an exemplary process by which a client node launches an application program from a Program Neighborhood web page displayed at that client node.

FIG. 3D shows an exemplary process of communicating between the client node 20, a server 30 that in this example acts as a web server, and server 32. The client node 20 authenticates itself to the server 30 as described above in connection with FIG. 2C. In one embodiment, the server 30 accesses an output display template 90, such as an SGML, HTML or XML file, to use as a base for constructing the Program Neighborhood window to transmit to the client node 20. The template may be stored in volatile or persistent memory associated with the server 30 or it may be stored in mass memory 92, such as a disk drive or optical device, as shown in FIG. 3D.

In this embodiment, the template 90 is a standard SGML, HTML, or XML document containing Program Neighborhood-specific tags that are replaced with dynamic information. The tags indicate to the server 30 where in the output display to insert information corresponding to available applications, such as icon images. In one particular embodiment, the Program Neighborhood-specific tags are embedded within comments inside the file, allowing the file to remain compatible with standard interpreters. In another embodiment, the Program Neighborhood-specific tags are extensions of the markup language used as the base for the template.

Examples of HTML tags that may be used in a template in accordance with the present invention are set forth below in Table 1:

TABLE 1

| Tag | Description |
| --- | --- |
| ControlField field value | This tag is used to set the value of data that either persists between Program Neighborhood web pages, are set by the user, or are used to help in cross page navigation, such as user name, domain, password, template, and application. |
| DrawProgramNeighborhood | His tag is used to draw a Program Neighborhood display at this location in an output display. |
| AppName | This tag is replaced by the name of the published application in the current context. |
| WindowType | This tag is replaced by the window type of the published application in the current context. |
| WindowHeight | This tag is replaced by the window height of the published application in the current context. |
| WindowWidth | This tag is replaced by the window width of the published application in the current context. |
| WindowScale | This tag is replaced by the window scale of the published application in the current context. |
| WindowColors | This tag is replaced by the color depth of the published application in the current context. |
| SoundType | This tag is replaced by the sound setting of the published application in the current context. |
| VideoType | This tag is replaced by the video setting of the published application in the current context. |
| EncryptionLevel | This tag is replaced by the encryption level of the published application in the current context. |

TABLE 1-continued

| Tag | Description |
| --- | --- |
| Icon | This tag is replaced by the icon of the published application in the current context. |

Other tags can be provided to set control fields and to provide conditional processing relating to the Program Neighborhood application.

In one embodiment, the template is constructed dynamically using, for example, COLD FUSION by Allaire Corp. of Cambridge, Mass. or ACTIVE SERVER PAGES by Microsoft Corporation of Redmond, Wash. Alternatively, the template may be static. The Program Neighborhood application parses the template, replacing Program Neighborhood-specific tags as noted above. Tags that are not Program Neighborhood-specific are left in the file to be parsed by the browser program 80 executing on the client 20.

In one embodiment, a template parser object is provided that accepts an HTML template as input, interprets Program Neighborhood-specific tags present in the template, and provides the original template with all Program Neighborhood tags replaced with appropriate text. The template parser object can be passed a cookie, a URL query string, or a control field from a web server interface to provide the information with which Program Neighborhood-specific tags should be replaced.

In another embodiment, the Program Neighborhood application allows scripts to access to information via an application programming interface. Scripts may be written in, for example, VBScript or JScript. In this embodiment, the scripting language is used to dynamically generate an output display using information returned by the application in response to queries posed by the script. Once the output display is generated, it is transmitted to client node 20 for display by the browser program 80.

A user of the client node 20 can launch an application by selecting an icon 57, 57' displayed in the Program Neighborhood web page. In some embodiments, each icon 57, 57' is an encoded URL that specifies: the location of the application (i.e., on which servers it is hosted or, alternatively, the address of a master server); a launch command associated with the application; and a template identifying how the output of the application should be displayed (i.e., in a window "embedded" in the browser or in a separate window). In some embodiments, the URL includes a file, or a reference to a file, that contains the information necessary for the client to create a connection to the server hosting the application. This file may be created by the Program Neighborhood application dynamically. The client node 20 establishes a connection (arrow 94) with the server identified as hosting the requested application (in this example, server 32) and exchanges information regarding execution of the desired application. In some embodiments, the connection 94 is made using the Independent Computing Architecture (ICA) protocol, manufactured by Citrix Systems, Inc. of Fort Lauderdale, Fla. Thus, the client node 20 may display application output in a window separate from the web browser 60, or it may "embed" application output within the web browser.

Figure 4:
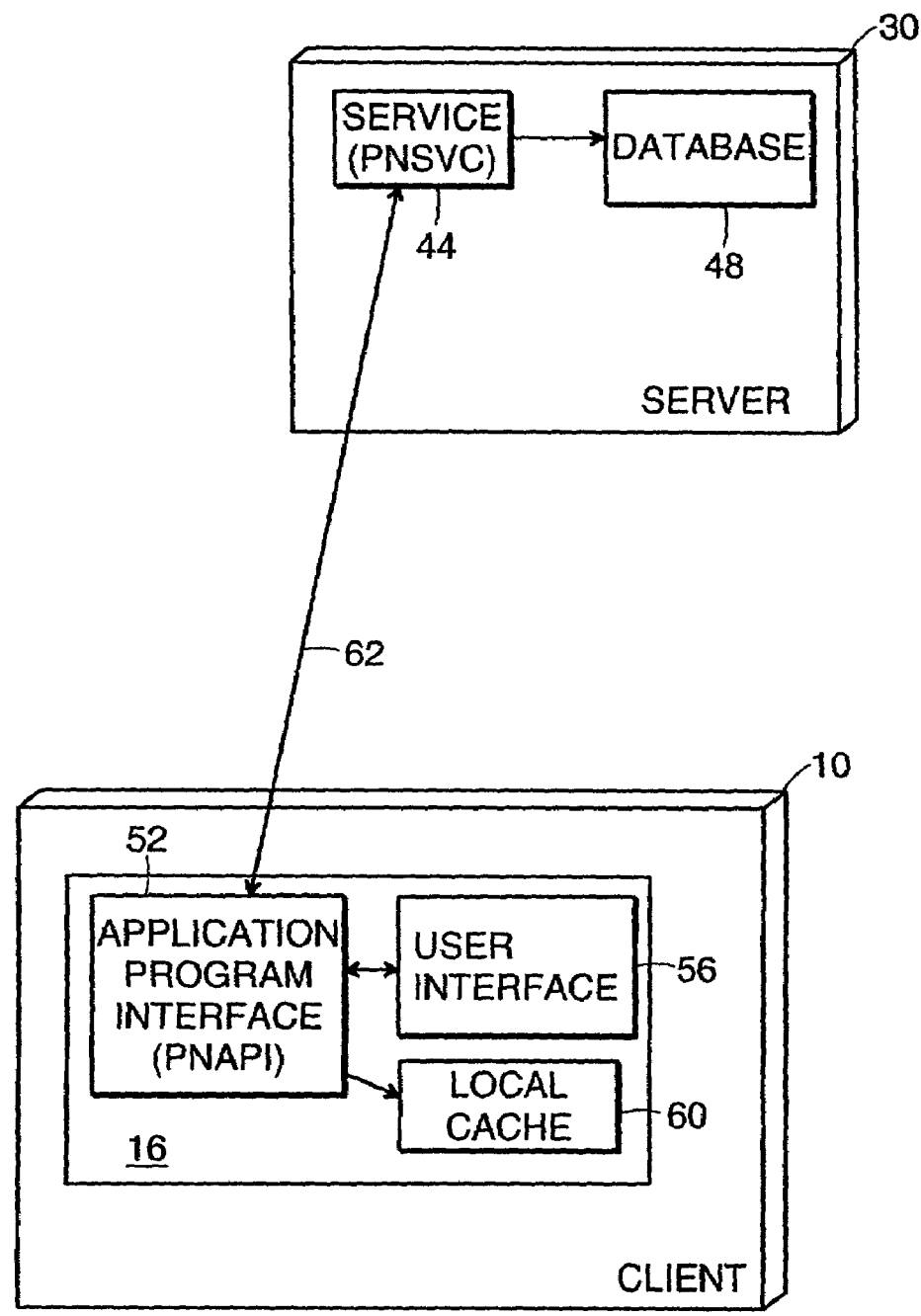
FIG. 4 is a block diagram of a client-based computing embodiment in which a client node having an installed program neighborhood application is in communication with one of a plurality of server nodes.

FIG. 4 illustrates an exemplary arrangement of program components for a client-based implementation of the Program Neighborhood application. A client-based implementation of Program Neighborhood application can be used in a network using either the server-based computing model in which the servers execute the Program Neighborhood application or the client-based computing model in which the client node 10 executes the Program Neighborhood application locally. The Program Neighborhood application includes a Program Neighborhood Service (PNSVC) component 44, an Application Database component 48, a Program Neighborhood Application Program Interface (PNAPI) component 52, a Program Neighborhood User Interface component 56, and a local cache 60.

The application server 30, for example, includes the service component (PNSVC) 44 and the application database 48. The client node 10, which is a representative example of a client node that can support a client-based implementation of the Program Neighborhood application, includes the application program interface PNAPI 52, the user interface user interface component 56, and the local cache 60 components. The PNAPI 52 communicates with the user interface component 56 and the local cache 60. The PNSVC 44 communicates with the application database 48 and with the PNAPI 52 on the client node 10 via communications link 62.

The communications link 62 can be established by, for example, using the ICA protocol. ICA is a general-purpose presentation services protocol designed to run over industry standard network protocols, such as TCP/IP, IPX/SPX, NetBEUI, using industry-standard transport protocols, such as ISDN, frame relay, and asynchronous transfer mode (ATM). The ICA protocol provides for virtual channels, which are session-oriented transmission connections that can be used by application-layer code to issue commands for exchanging data. The virtual channel commands are designed to be closely integrated with the functions of client nodes. One type of virtual channel connection supported by the ICA protocol is a Program Neighborhood virtual channel.

The Program Neighborhood virtual channel protocol can include four groups of commands:
(1) initialization-related commands;
(2) single authentication related commands that can be supported by each client node wanting a copy of the user credentials;
(3) application data related commands for implementing the Program Neighborhood user interface; and
(4) application launch callback-related commands for running the user interface on an application server.

Application Database

The application database 48 is a cache of the authorized user and group information for all the public (i.e., published) applications in a server farm or in a group of trusted domains. Each server in a server farm can maintain its own application-related information in persistent storage and build up the database 48 in volatile storage. In another embodiment, all collected application-related information in the database 48 can be stored in persistent storage and made accessible to each other server in the server farm. The database 48 can be implemented in a proprietary format (e.g., as a linked list in memory) or using Novell's Directory Services (NDS) or any directory service adhering to the X.500 standard defined by the International Telecommunication Union (ITU) for distributed electronic directories.

The application database 48 includes a list of application servers. Each server in the list has an associated set of applications. Associated with each application is application-related information that can include the application name, a list of servers, and client users that are authorized to use that application. A simplified example of the application-related information maintained in the database is illustrated by the following Table 2. Users A and B are users of the client nodes 10, 20, "n/a" indicates that the application is hosted, but is not available to client node users, and "–" indicates that the application is not hosted.

TABLE 2

| | Applications | | | |
|---|---|---|---|---|
| Server Name | Spreadsheet | Customer Database | Word Processor | Calculator |
| Server 30 | User A | User B | n/a | — |
| Server 32 | User B | n/a | User A | — |
| Server 34 | — | — | — | User A User B |

Table 2 shows a list of servers 30, 32, 34, the applications hosted by the servers, (Spreadsheet, Customer Database, Word Processor, and Calculator), and those users who are authorized to use the applications. For example, server 30 hosts the Spreadsheet program, the Customer Database and the Word Processor. User A is authorized to use the Spreadsheet, User B is authorized to use the Customer Database, and no users are authorized to use the Word Processor. It is to be understood that other techniques can be used to indicate who is authorized to use a particular application. For example, the user information stored in the database can be used to indicate those users who are unauthorized to use a particular application rather than those who are authorized.

To obtain the information that is stored in the database 48, the server 30 obtains the application-related information from each other server in the server farm regarding the applications on those servers, including control information that indicates which client users and servers are permitted to access each particular application. The application-related information maintained in the database may or may not persist across re-boots of the server 30.

The application database 48 can be a central database that is stored at the application servers 30 and is accessible to all of the servers in the server farm. Accordingly, the application-related information can be available for use by other servers such as those servers that perform published application authentication during session log-on and application launching. In another embodiment, the application database 48 can be maintained at each of the application servers based upon the information that each server obtains from communications with each other server in the server farm.

Program Neighborhood Service Program (PNSVC)

Each server 30, 32, 34 and 36 having the Program Neighborhood application installed thereon executes the PNSVC software 44. The PNSVC software 44, operating on each server 30, 32, 34 and 36 establishes a communication link (e.g., a named pipe) with each other server. The servers 30, 32, 34 and 36 exchange the application-related information on the named pipes. In another embodiment, the PNSVC software 44 collects the application-related information from the other servers in the server farm through remote registry calls (e.g., the service component 44 transmits a datagram to other servers in the plurality requesting the application-related information corresponding to the application programs hosted by those servers). The PNSVC 44 software also maintains the relationships of groups and users to published applications in the application database 48 and accesses the information when authenticating a client user. An administrator of the server 30 can use a user interface to configure the PNSVC 44.

Other functions of the PNSVC software 44 include implementing the services and functions requested by the PNAPI 52 and communicating with the PNAPI 52 on the client node 10 using a Program Neighborhood virtual device driver (VDPN). The VDPN operates according to the Program Neighborhood virtual channel protocol described above for establishing and maintaining an ICA connection.

Program Neighborhood Application Program Interface (PNAPI)

The PNAPI 52 is a set of software functions or services that are used by the Program Neighborhood application to perform various operations (e.g., open windows on a display screen, open files, and display message boxes). The PNAPI 52 provides a generic mechanism for launching application objects (e.g., icons) produced by running the Program Neighborhood application and application objects in a legacy (i.e., predecessor or existing for some time) client user interface. When the client node 10 launches an available application, the launch mechanism can launch the application on the server 30, if necessary (e.g., when the client node 10 does not have the resources to locally execute the application).

The PNAPI 52 provides all published application information to the user interface component 56 for display on the screen 12 of the client node 10. The PNAPI 52 also manages server farm log-ons in a local database of logon credentials (e.g., passwords) for users of the client node 10 to support the single authentication feature. Credentials may or may not be persistent across bootings (power-off and on cycles) of the client node 10.

The PNAPI 52 provides automatic and manual management for Program Neighborhood application objects stored in the local cache 60. The local cache 60 can either be refreshed manually by the user of the client node 10, or at a user-definable refresh rate, or by the server at any time during a connection. In a Windows implementation, the PNAPI 52 can build remote application file associations and manage the "Start" menu and desktop icons for application object shortcuts.

Program Neighborhood User Interface

The user interface module 56 interfaces the PNAPI 52 and can be a functional superset of an existing client-user interface (e.g., Remote Application Manager). The user interface module 56 accesses the information stored in the local cache 60 through the PNAPI 52 and visually presents that information to the user on the display screen 12 of the client node 10. The displayed information is a mixture of information generated by a user of the client node 10 and information obtained by the Program Neighborhood application. The user interface module 56 can also show the user all applications that the user is currently running and all active and disconnected sessions.

In a graphical embodiment, the user interface module 56 can present a variety of graphical components, such as windows and pull-down menus, to be displayed on the display screen 12. A display of a combination of such graphical user interface components is generally referred to as a "desktop." A desktop produced by the user interface module 56 can include a Program Neighborhood window displaying the neighborhood of application programs available to the user of the client node 10 for use. These application programs are a filtered combination of the published applications hosted by a server farm on the network. The user interface module 56 can generate a Program Neighborhood window for each server farm or merge the applications from different server farms under a single Program Neighborhood window.

At a top level, the Program Neighborhood window includes a folder for each server farm. Clicking on one of the folders with the mouse 18 produces a window containing a representation (e.g., an icon) of each hosted application available to the user, e.g., see FIGS. 6A and 6B. The Program Neighborhood window becomes the focal point for launching published applications, and the user interface module 56 can be used to launch applications through the PNAPI 52. For example, the user of the client node 10 can use the mouse 18 to select one of the displayed icons and launch the associated application.

A feature of a client-based implementation is that the user can browse the objects displayed in the Program Neighborhood window although the client node is offline, that is, the ICA connection 62 is inactive. Also, a user of the client node 10 can drag application objects and folders out of the Program Neighborhood window and into other graphical components (e.g., other windows, folders, etc.) of the desktop.

Figure 5:
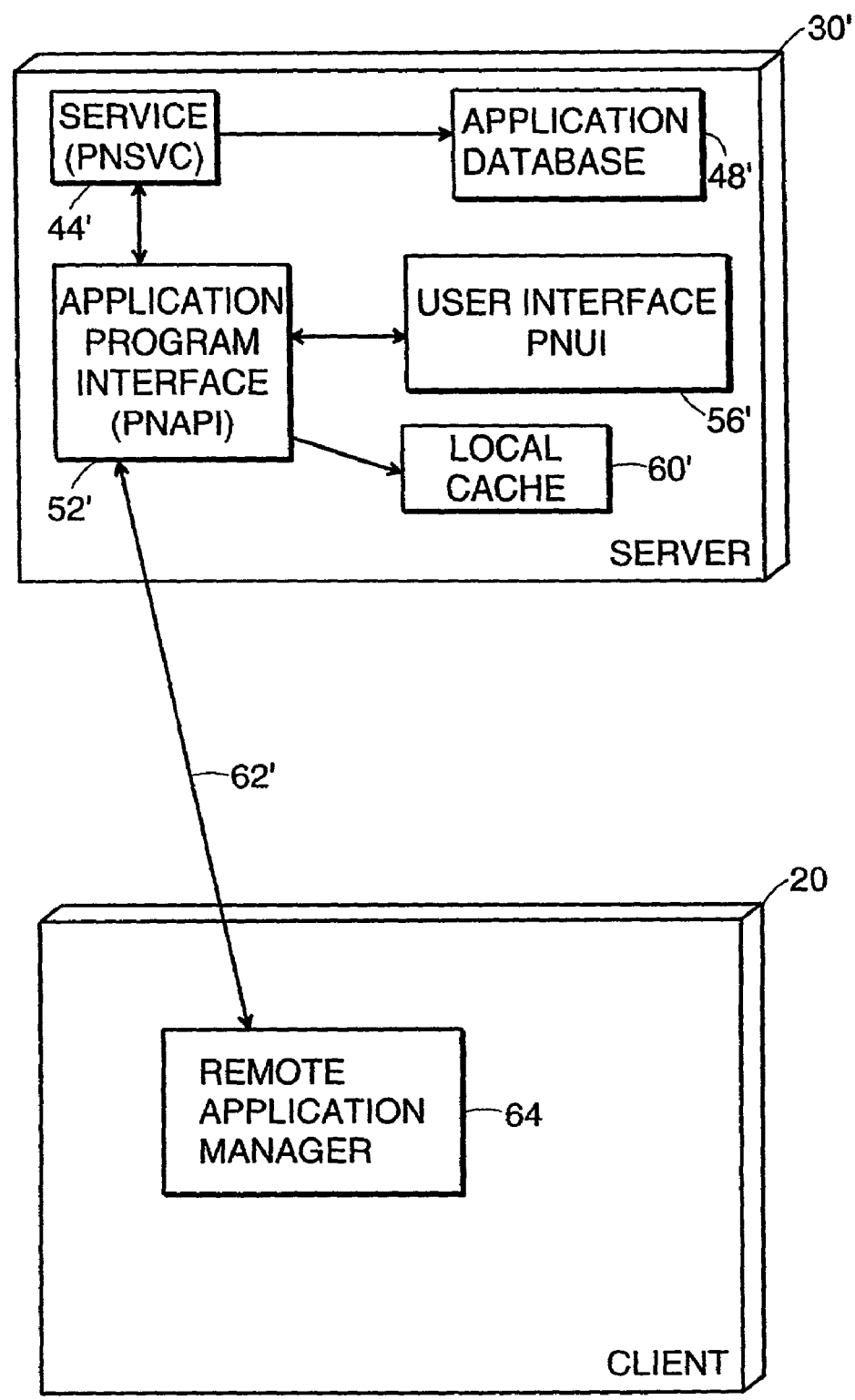
FIG. 5 is a block diagram of a server-based computing embodiment in which a client node is in communication with a server node having an installed program neighborhood application.

FIG. 5 shows an exemplary arrangement of program components for a server-based implementation of the Program Neighborhood application. The components include a Service (PNSVC) component 44', an Application Database component 48', an Application Program Interface (PNAPI) component 52', a User Interface component 56' and a local cache 60'. Each software component 44', 48', 52', 56', and 60' is installed on the application server 30'. The software components for the server-based implementation correspond to the software components for the client-based implementation of FIG. 4. The functionality of each server-based software component is similar to the client-based counterpart, with differences or added capabilities described below. The PNSVC 44' communicates with the application database 48' and with the PNAPI 52' using local procedure calls. The PNAPI 52' also communicates with the user interface module 56' and the local cache 60'.

Similar to that described in FIG. 4 for the client node 10, the client node 20 logs on to the network 40, the server 30' develops and maintains a database containing the application related information collected from the other servers 32, 34 in the server farm, and a communication link is established between the server 30' and the client node 20. The application server 30' is in communication with the client node 20 via an ICA channel connection 62'. The channel connection 62' can be established by an ICA virtual channel protocol (e.g., Thinwire). The Thinwire protocol can be used to transmit presentation commands from Windows-based applications running on the application server 30' to the client node 20. To a user of the client node 20, the applications appear to be running on the client node 20. The client node 20 can include a Remote Application Manager application program 64 that communicates with the application server 30' via the ICA channel connection 62'.

To run the Program Neighborhood application in a server-based implementation, the user of the client node 20 connects to an initial desktop (at the server 30') and launches the Program Neighborhood application from within that desktop environment. The connection to the initial desktop can occur automatically, e.g., via a logon script of the client node 20, via an entry in the StartUp group in Windows 95, or by another centrally managed server specific mechanism. All remote application management and launching is accomplished through this initial desktop.

Similar to that described in FIG. 4 for the server 30, the server 30' uses the user credentials to determine those application programs that are authorized for use by the user of the client node 20. A Program Neighborhood graphical window is returned to the client node 20 and displayed on the client screen 22. This window can contain icons representing the available and, possibly, the unavailable application programs that are in the program neighborhood of the client node 20.

The user of the client node 20 can select and launch one of the application programs displayed in the Program Neighborhood window. When launching an application, the Program Neighborhood application can execute the application on the same server 30', where applicable, taking into account load balancing requirements among servers and the availability of the application on that server 30'. The PNAPI 52' can include a launch mechanism for launching a remote application locally on the server 30' when the server 30' is nominated to launch the application. When a different server is needed to run the application, the Program Neighborhood application can launch the application via the server 30' (i.e., server-based client) using the windows to present the application on the desktop of the client node 20 as described above in FIG. 3B.

In one embodiment, the web-based Program Neighborhood application includes a group of objects that manage various aspects of the application. In one embodiment, the application includes three primary object classes that "plug in" to a web server: a gateway object class; a credentials object class; and an applications object class. In some specific embodiments, the object classes are provided as Java beans. The three primary object classes facilitate: validation of user credentials into a server farm; generation of lists of published applications that a specified user may access; provision of detailed information about a specific published application; and conversion of published application information into an ICA-compatible format.

When provided as Java beans, the objects can be accessed in a number of different ways. For example, they may be compiled as COM objects and made available to the web server as ActiveX components. In another embodiment, the Java beans can be used in their native form, such as when the server uses Java Server Pages technology. In yet another embodiment, the Java beans can be instantiated and used directly in a Java servlet. In still another embodiment, the server 30 can instantiate the Java beans as COM objects directly.

A credentials object class manages information necessary to authenticate a user into a target server farm. A credentials object passes stored user credentials to other Program Neighborhood objects. In some embodiments, the credentials object is an abstract class that cannot be instantiated and represents a user's credentials. Various class extensions may be provided to allow different authentication mechanisms to be used, including biometrics, smart cards, token-based authentication mechanisms such as challenge-response and time-based password generation, or others. For example, a "clear text credentials" extension may be provided that stores a user's name, domain, and password in plain text.

A gateway object class handles communications with a target server farm. In one embodiment, the gateway object class is provided as an abstract Java class that cannot be instantiated. A particular gateway object may retrieve application information by communicating with a server farm using a particular protocol, reading cached application information, a combination of these two methods, or other various methods.

As noted above, the gateway object class caches information to minimize communication with a target server farm. Extensions to the gateway object may be provided to communicate with the server farm over specific protocols, such as HTTP. In one embodiment, an extension class is provided that allows the gateway object to communicate with the server farm via WINDOWS NT named pipes. The gateway object may provide an application programming interface hook that allows other Program Neighborhood objects to query the object for application information.

An applications object class contains information about published applications and returns information about applications hosted by the server farm in order to create the Program Neighborhood web page. The applications object class creates objects representing applications by retrieving information relating to the applications, either from an object created by the gateway object or directly from the servers in the server farm. An applications object acts as a container for certain properties of the application, some settable and some not settable, such as: the name of the application (not settable); the percentage of the client's desktop that the client window should occupy (settable); the width of the client window, in pixels, for this application (settable); the height off the client window, in pixels, for this application (settable); the number of colors to use when connecting to the application (settable); the severity of audio bandwidth restriction (settable); the level of encryption to use when connecting to the application (settable); the level of video to use when connecting to this application (settable); whether the application should be placed on a client's start menu (settable); whether the application should be placed on the client's desktop (settable); the identity of the Program Neighborhood folder to which the application belongs (settable); the description of the application (settable); the source of the graphics icon file for the application (settable); the type of window that should be used when connecting to the application (not settable); and whether to override default parameters for the object.

Figure 6A:
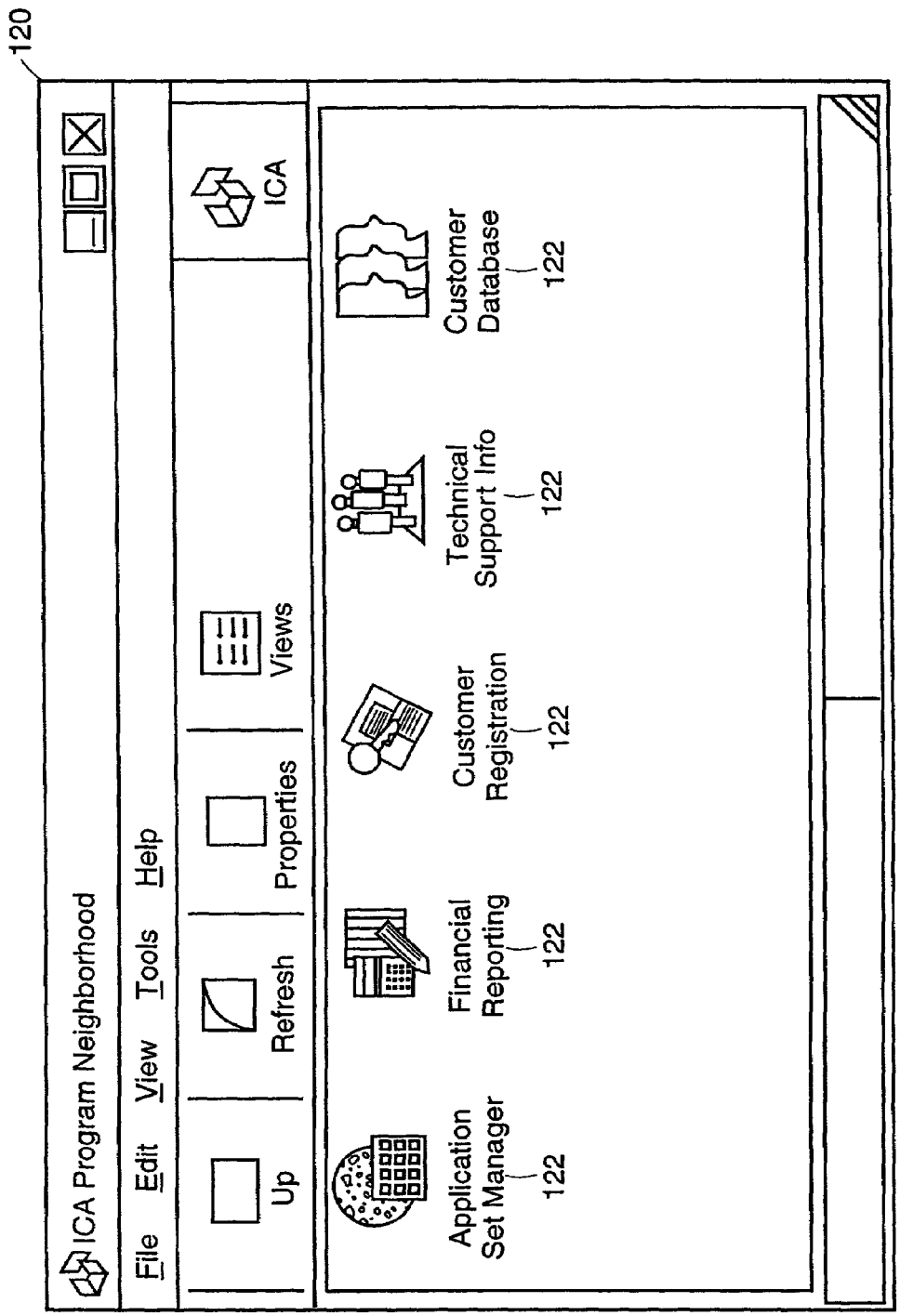
FIG. 6A is a screenshot of an exemplary display on the display screen of a client node after the program neighborhood application program is executed.

FIG. 6A is a screenshot of an exemplary Program Neighborhood window 120 that can be displayed on the screen 18, 22 of either client node 10, 20 after the Program Neighborhood application has executed. The window 120 includes graphical icons 122. Each icon 122 represents an application program that is hosted by one of the servers 30, 32, 34 and 36 on the network 40. Each represented application is available to the user of the client node for execution. The user can select and launch one of the applications using the mouse 18, 28 or keyboard 14, 24.

Figure 6B:
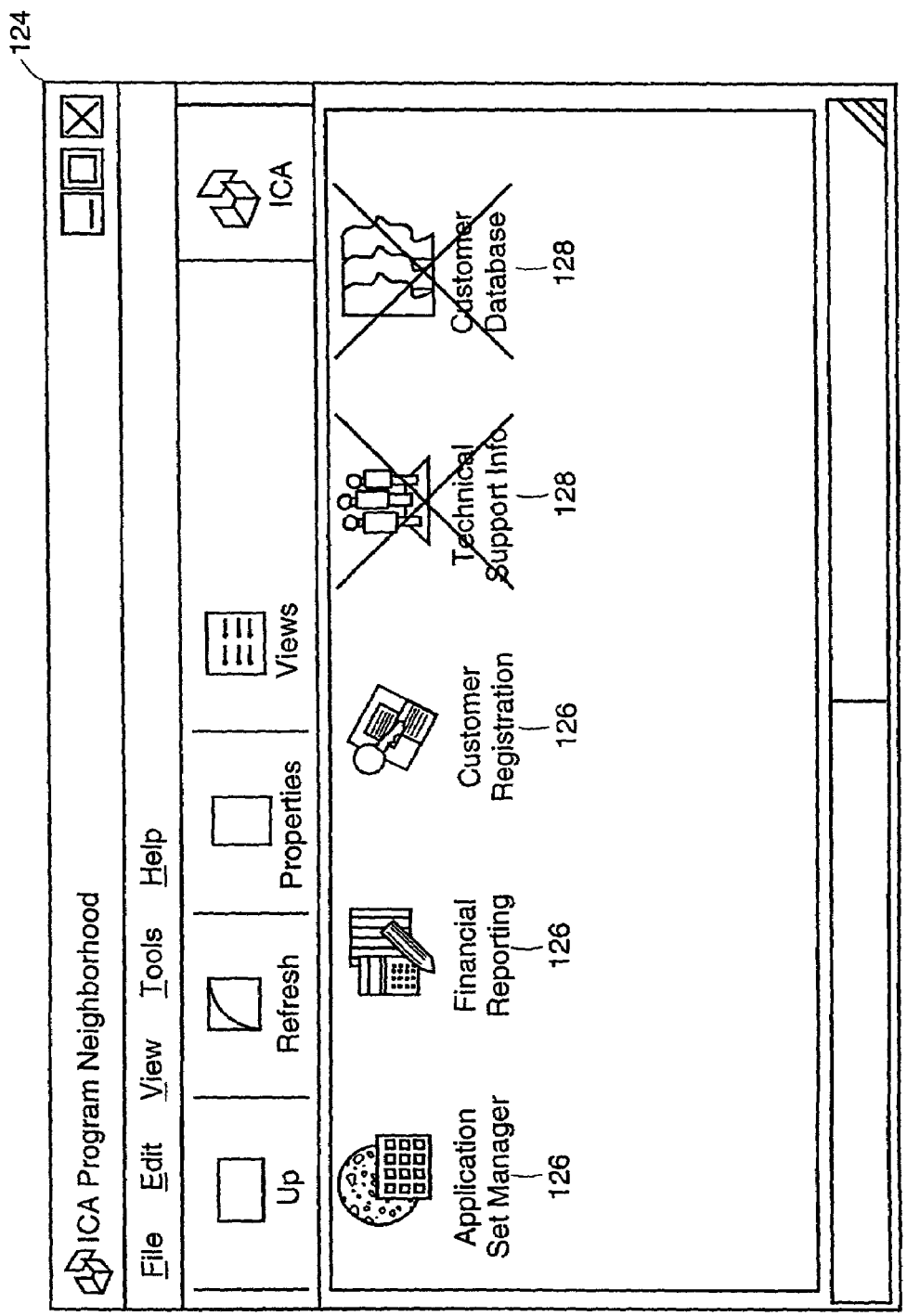
FIG. 6B is a screenshot of another exemplary display on the display screen of a client node after the program neighborhood application program of the invention is executed.

FIG. 6B is a screenshot of another exemplary Program Neighborhood window 124 that can be displayed on the screen 18, 22 of either client node 10, 20 after the Program Neighborhood application has executed. The window 124 includes graphical icons 126, 128. Each icon 126, 128 represents an application program that is hosted by one of the servers 30, 32, 34 and 36 on the network 40. Each application program represented by one of the icons 126 is available to the user of the client node 10, 20 for execution. The user can select and launch one of the applications using the mouse 18, 28 or keyboard 14, 24. For web-based program neighborhood environments, the screenshots of FIGS. 6A and 6B are similar, except that icons 122, 166, 128 are displayed within a browser window.

Each application program represented by one of the icons 128 is unavailable to the user of the client node 10, 20, although such applications are present in the server farm. The unavailability of these application programs can be noted on the display screen (e.g., "X"s can be drawn through the icons 128). An attempt to launch such an application program can trigger a message indicating that the user is not authorized to use the application.

Figure 7:
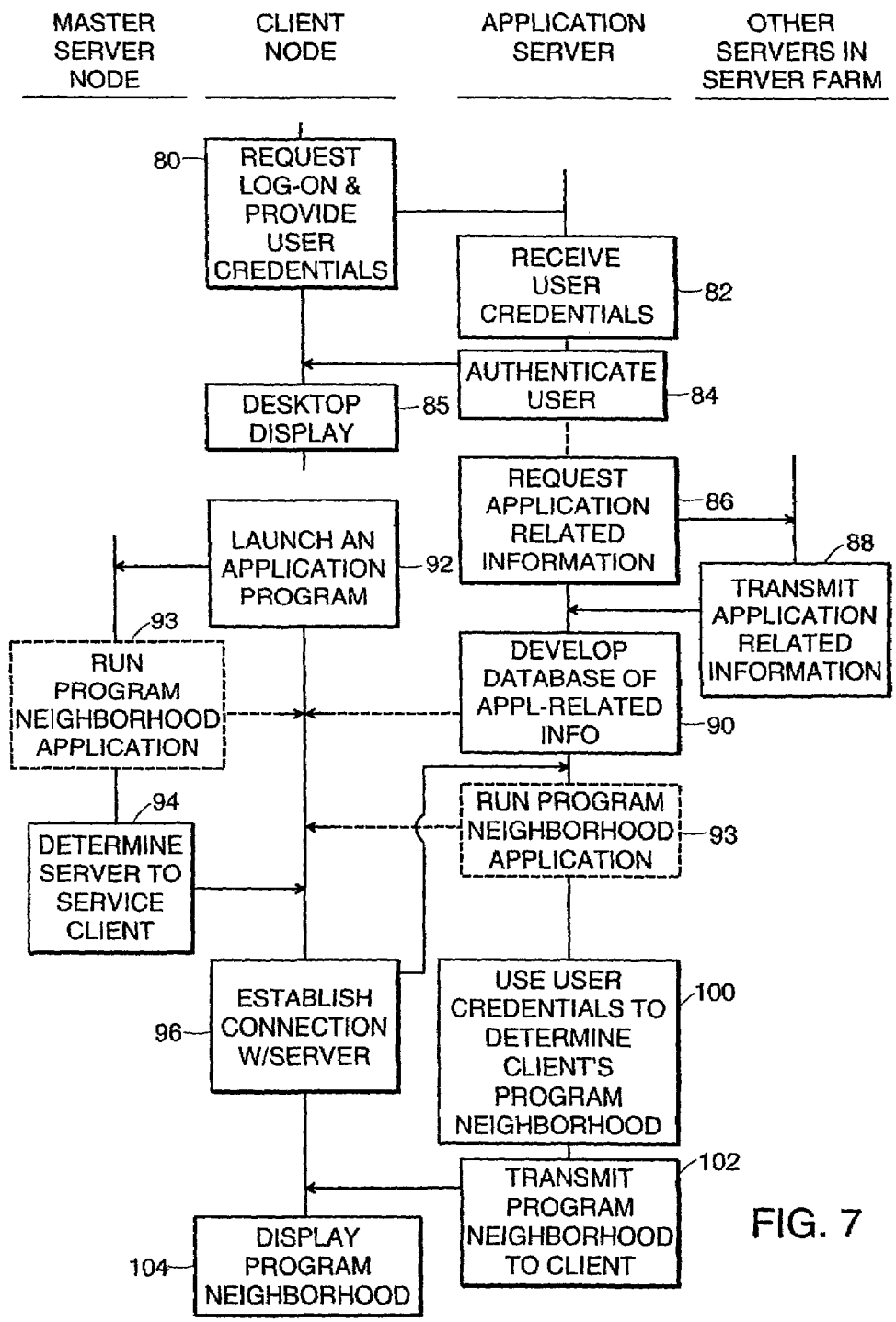
FIG. 7 is a flow chart representation of an embodiment of a process by which a client node is informed as to the availability for use of application programs on the application servers.

FIG. 7 shows an exemplary process by which a user of either client node 10, 20 can be informed about the availability of applications hosted by application servers 30, 32, 34 and 36 on the network 40. In step 80, the client node 10, 20 requests log-on service from one of the servers, e.g., server 32. The server 32 requires valid user credentials to establish the connection. The server 32 receives the user credentials from the client node 10 (step 82), and authenticates the user for log-on (step 84). A desktop is displayed at the client node 10, 20 (step 85). The desktop can include a graphical icon representing the Program Neighborhood application program.

In step 86, the application server 32 establishes a connection with each other servers 30, 34 and 36 to exchange application-related information, as described above, corresponding to application programs hosted on those servers (step 88). In step 90, the application server 32 develops and maintains a database of the collected application-related information. Each other server 30, 34, 36 in the server farm can develop a database equivalent to the database of the server 32 and in similar manner as the server 32. In another embodiment, the database of the server 32 can be a centralized database that is accessible to each other application server 30, 34, 36 in the server farm. The collecting of application-related information can occur independently or be triggered by the request of the client node 10, 20 to log-on to the server farm 38.

In step 92, the client node 10, 20 can request execution of an application program from the desktop display. The master server node can process the request and, using a load-balancing evaluation and application availability as described above, determine the application server to provide the service to the client node 10, 20 (step 94). For example, the application server 32 can be selected to service the request with the client node 10, 20. In step 96, the client node 10, 20 establishes a communications link with the server 32. The server 32 and the client node 10, 20 can communicate according to the ICA protocol appropriate for that client node as described above.

Also in response to this request to run the application program, the master server node 30 or the server 32 can run the Program Neighborhood application (step 93) and push the results to the client node 10, 20, although the client node 10, 20 may not have requested the PN application program. When executing the PN application program, the master server node 30 or server 32 filters the application-related information in the database using the user credentials (step 100). The result of filtering the database determines those application programs that are authorized for use by the user of the client node 10, 20. The authorized application programs are in the program neighborhood of the client node 10, 20. This program neighborhood of available application information is pushed to the client node 10, 20 (step 102) and displayed on the client screen 12, 22 in a Program Neighborhood graphical window (step 104).

In other embodiments, the Program Neighborhood window may include applications that are in the server farm but unavailable for use to the client node 10, 20. In a Windows-based implementation, the available (and unavailable) application programs can be represented by icons. The user of the client node 10, 20 can select and launch one of the application programs displayed in the Program Neighborhood window.

File-Type Association (FTA)

As discussed, in one embodiment the Program Neighborhood mechanism permits users to identify, select, and execute executable programs not necessarily installed on their client node. In another embodiment, additional FTA functionality permits users to automatically initiate the execution of executable programs associated with a data file, even though the data file and the executable program are hosted on different computing nodes.

Typically, FTA functionality permits users to transparently execute executable programs by selecting data files located on a computing node that differs from the node(s) where the executable programs are located. In one embodiment, a user can transparently invoke the execution of an executable program on a server node by selecting a data file located on their client node. In another embodiment, a user can transparently invoke the execution of an application program on their client node by selecting a data file located on a server node. In still another embodiment, a user can select a data file stored on a web server and transparently invoke the execution of an associated executable program on a server node. Typically, execution permits processing of the contents of the selected data file, the output of which is then provided to the user at the client node.

As described above, the client node is in communication with one or more server nodes. The client node executes an operating system that includes functionalities that permit the selection of graphical indicia representative of files, the display of bitmapped graphics, and the initialization and operation of telecommunications links. In one embodiment, these functionalities are integrated with the operating system. In another embodiment, these functionalities are provided by software from one or more third-party vendors that is separately installed and maintained on the client node.

The server node executes an operating system including functionality that permits the initialization and operation of telecommunications links and the execution of executable programs. In one embodiment, these functionalities are integrated with the operating system. In another embodiment, these functionalities are provided by software from one or more third-party vendors that is separately installed and maintained on the server node.

In the present discussion, it is to be understood that examples using filename extensions necessarily reflect the idiosyncrasies of embodiments utilizing the WINDOWS family of operating systems. Other embodiments implement methods and apparatus in accord with the present invention using special parameters stored in the data file itself, the data contained in the data file, the file system records associated with the data file, or a separate data file or database. For example, in embodiments utilizing the MacOS family of operating systems, the present invention utilizes file and application creator types and stores file-type association data in the Desktop file associated with each storage device. Embodiments using a UNIX-variant operating system utilize file extensions, embedded parameters, or other mechanisms as appropriate. Accordingly, the scope of the claims should not be read to be limited to embodiments relying on filename extensions or embodiments utilizing WINDOWS operating systems.

Client-Based FTA

Figure 8A:
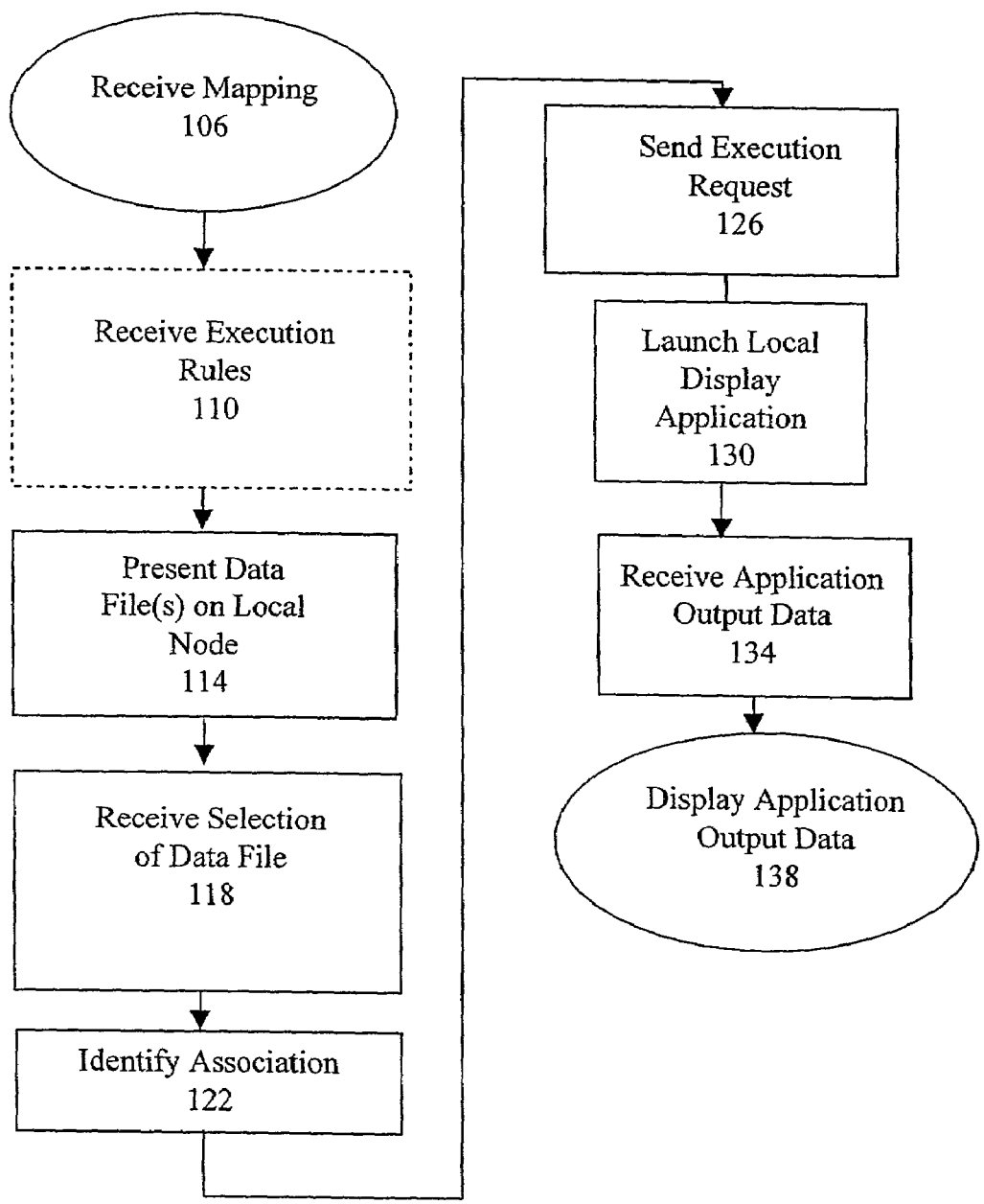
FIG. 8A is a flow chart representation of an embodiment of a process by which a user executes an application program on a server node by selecting a data file hosted by his or her client node.

Referring to FIG. 8A, in one embodiment the present invention enables transparent distributed program execution on a server node through the selection of graphical indicia representative of a data file located on the client node. The client node receives, from one of a plurality of server nodes, a mapping specifying an association between a type of data file and an executable program for execution on one of a plurality of server nodes (Step 106). The client node presents a graphical depiction of a data file stored on the client node (Step 114) and receives a selection of the graphical depiction of the data file (Step 118). The client node identifies an executable program associated with the type of the selected data file using the received mapping (Step 122) and sends a request to execute the identified executable program (Step 126). In another embodiment, the client node initiates the execution of a local display application (Step 130) to receive application output data from the executing program (Step 134), which it displays to the end user (Step 138).

Still referring to FIG. 8A, when the client node receives the mapping (Step 106), the mapping may be received by itself, with several other mappings, or with other messages or data such as software updates. Table 3 illustrates a exemplary mapping provided in one embodiment of the invention:

TABLE 3

| File type: | Executable program: |
|---|---|
| ".DOC", ".RTF" | MSWORD.EXE |
| ".PDF" | ACROBAT.EXE |

In one embodiment, the mapping identifies an association between a particular executable program for use with a particular data file stored on the user's client node. For example, the mapping would specify the use of WORD to edit the file "RECORDS.DOC". In another embodiment, the mapping specifies an association between a particular executable program and a particular type of data file stored on the user's client node. For example, the mapping would specify the use of WORD to edit all files ending in the extension ".RTF" In yet another embodiment, the mapping specifies a particular type of executable file for use with a particular data file or a particular type of data file. For example, the mapping would specify the use of a "word processing application" when a data file containing word processing information is selected, as determined by examining the file or special parameters coded into or associated with the file.

In still another embodiment, the mapping specifies the relationship between an executable program and a data file in terms of a client node application that launches the executable program on a server node and displays the output from execution at the client node. For example, the mapping could specify that when a ".DOC" file is selected, the client node is to execute METAFRAME from Citrix Software of Ft. Lauderdale, Fla., which in turn sends a request to one of a plurality of server nodes to execute WORD, receiving the output data from execution for display to the user at the client node. In yet another embodiment, the entry for the associated executable program includes one or more parameters, flags, or arguments that control execution on the server node. For example, the entry specifying the local execution of METAFRAME and the remote execution of WORD can take the form "C:\PROGRA~1\MF.EXE MSWORD.EXE" which indicates that the METAFRAME application is stored locally at C:\PROGRA~1\MF.EXE and the application to be executed on the server node is MSWORD.EXE.

In one embodiment, the executable program in the mapping is specified as a vendor name, e.g. "MICROSOFT WORD." Upon receipt, the client node identifies at least one of the file path and the file name associated with the vendor name "MICROSOFT WORD" for later use when applying FTA functionality. In another embodiment, the executable program in the mapping is specified as a file name in accord with the naming convention utilized by the client node operating system. For example, on a client node employing a WINDOWS-family operating system, the associated executable program could be identified as "MSWORD.EXE." After receiving this mapping, the client node either locally identifies and stores the path to the executable file, e.g., "C:\PROGRA\~1\MSOFFICE\MSWORD.EXE", or it dynamically locates the executable file each time FTA is invoked for that particular executable program.

In one embodiment, the received mapping is incorporated into a file containing a system database that tracks associations between executable programs and data files or types of data files. For example, the file could be the registry on a WINDOWS system or the desktop file on a MacOS system. In another embodiment, the mapping is stored in a file that is accessed by one or more executable programs in order to provide the aforementioned FTA functionality. For example, a Java-based executable could receive the mapping and store it in a text file on the client node for use by other Java-based executables. In yet another embodiment where no file system functionality is present, for example, an embedded device, the mapping is received and stored in random-access memory at a specific address. In still another embodiment, the mappings are stored remotely on, for example, one of a plurality of servers and retrieved on an as-needed basis by executable programs on the client node. The mappings themselves can be stored in any data structure, including but not limited to an array, a linked list, a flat database, or a relational database.

In one embodiment, these mappings are periodically updated using client-based, i.e., "pull" techniques. In another embodiment, these mappings are periodically updated using server-side, i.e., "push" techniques. In yet another embodiment, these mappings are updated using either push or pull techniques on an as needed basis, for example, when a system administrator installs a new application program and provides support for it on a server node or across a server farm.

In one embodiment, the client node receives rules that control the location of execution of the executable program (Step 110). In one embodiment, the rules for determining whether a particular executable program executes on the client node, a server node, or a particular server node may depend on one or more variables. Such variables include but are not limited to the execution load on the client system, the execution load on one of the plurality of server systems, the execution load on the collective plurality of server systems, the speed of the connection between the client system and the plurality of server systems, or any combination of these or other factors. If, for example, the mapping required that the selection of a ".DOC"-type document initiate the execution of a local thin-client application that would receive and display output from WORD executing on a server node in a server farm, then a conditional rule could specify that if the execution load on the client system consumed more than 50% of available CPU time and the connection to the server farm either exceeded 1 Mbit/sec in theoretical capacity or 20 Kbit/sec in available capacity, then WORD should be executed remotely on the server farm with its application output data provided to the thin-client application for display to the end user. In one embodiment, when the evaluation of a rule indicates that the associated executable program should execute on the client node, the client node provides the output of the executing program directly to the user, bypassing any thin-client application.

In actual operation, when the user selected a ".DOC" document, the associated application, i.e., WORD, would be identified, any accompanying rules would be loaded and evaluated, and the associated application would either be executed locally on the client node or remotely on a server node in response to the evaluation of the rule. If the evaluation indicates the application program is to execute on a server node, a request to execute the program is transmitted to the server node (Step 126).

The receipt of mappings, conditional rules, or some combination of the two can occur through several mechanisms. Mappings and conditional rules may be distributed over a live telecommunications link, or off-line using one or more forms of portable storage media. They may be distributed in real-time, while the client node and at least one of the plurality of server nodes is in use, or off-line, either at a scheduled time, within a scheduled time window, or when either or both of the client node and at least one of the plurality of server nodes is not in active use by an end user.

With the mappings and, in some embodiments, conditional rules installed, the user interacts with the client node using its graphical user interface. The data files present on the local client node are presented graphically to the user (Step 114). In a typical embodiment, the client node displays one or more icons representative of data files stored on the client node. In another embodiment, the client node displays a list of file names associated with data files stored on the client node. In still another embodiment, indicia representative of files stored on the client node are intermingled with indicia representative of files stored on one or more server nodes. In this embodiment, client-based FTA is operative when indicia representative of a file stored on the client node is selected. In another embodiment, multiple forms of FTA (see below) are operative, with the appropriate form of FTA activated based on the location of the file associated with the selected indicia.

The user selects a particular data file by interacting with the graphical depiction of the data file (Step 118). The icon or text representative of the data file is typically selected using a keyboard, a mouse, a light pen, a pressure-sensitive tablet, a haptic interface, or other input device.

Once the data file is selected, functionality on the client node accesses the stored mappings, and in some embodiments, the stored conditional rules, and identifies those mappings and rules associated with the selected data file or the type of the selected data file (Step 122). If the mapping indicates that the data file is associated with an application to be executed on one of a plurality of servers, and the evaluation of any associated conditional rules so indicates, then the client node sends an execution request to one of a plurality of servers hosting the associated application program (Step 126).

Upon execution, the associated application program will typically generate one or more forms of output data, including but not limited to graphical output data or sound. In one embodiment, the client node initiates the execution of an application program (Step 130) that, through a connection with the server node, receives the application output data (Step 134) and displays it to the end user (Step 138). In one embodiment, this application program is METAFRAME.

In one embodiment, the client node also provides data associated with the selected data file to the server node for processing. In one embodiment, the client node utilizes a network connection with the server node to provide the data. In another embodiment, the client node provides a pointer to the contents of the data file to the server node. In turn, the server node generates sequential or random access requests for data utilizing the pointer, which it provides to the client node. The client node processes these requests and provides the appropriate data to the server node.

This client-server arrangement permits the usage of client nodes and server nodes based on different computing architectures. For example, the client node may be a POWERPC based MACINTOSH executing a local display application and the server node may be an ITANIUM based WINDOWS NT server. As long as the client node and the server node are equipped with functionalities that agree on the formats for the transmission, exchange, and display of application output data, binary-level interoperability between the nodes is unnecessary.

Figure 8B:
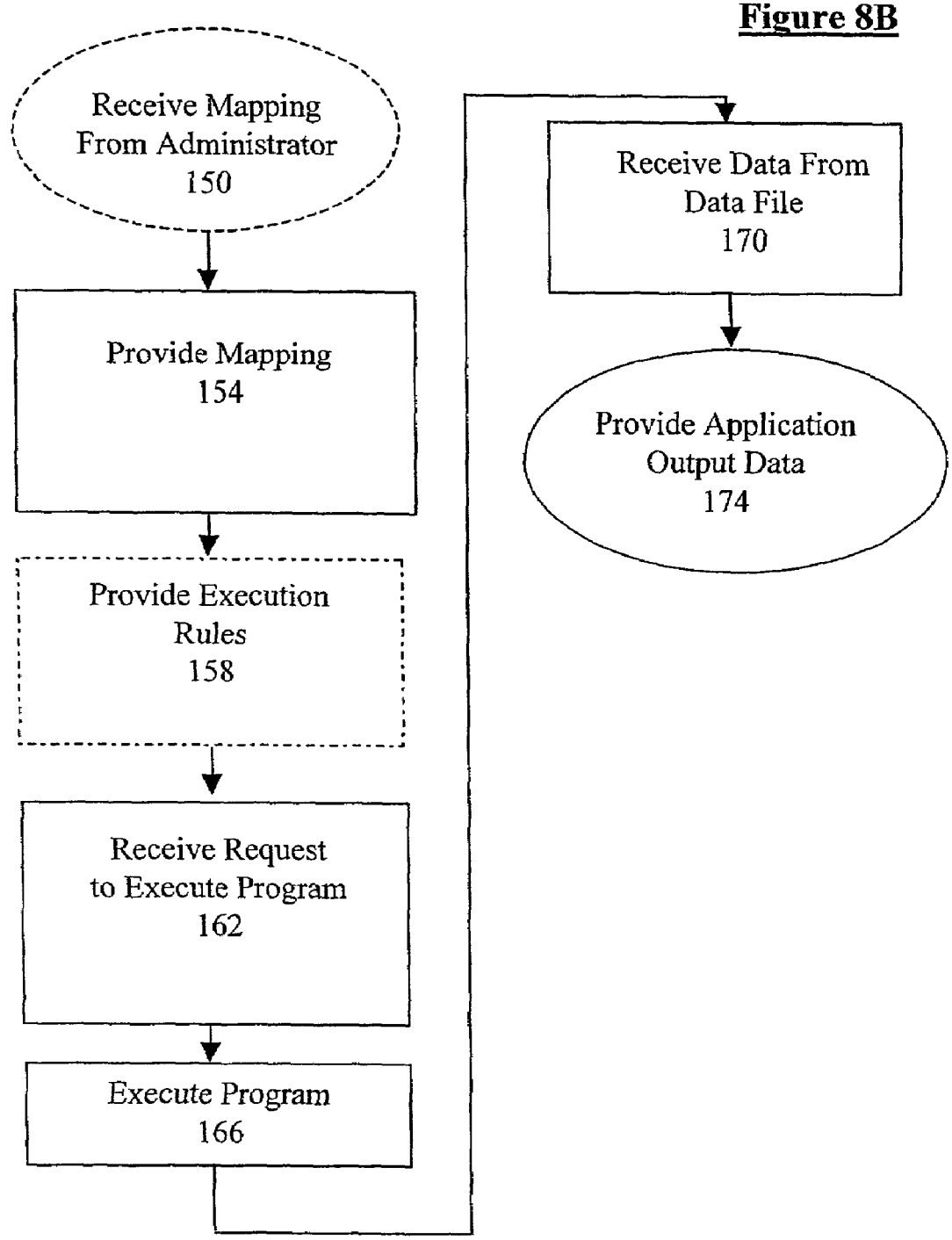
FIG. 8B is a flow chart representation of the role of the server node in the embodiment of FIG. 8A.

FIG. 8B illustrates the typical role of a server node in the client-based file-type association process. A mapping is provided specifying an association between a type of data file stored on a client system and an executable program for execution on one of a plurality of server nodes (Step 154). A request to execute the executable program is received (Step 162) and the executable program is executed on one of a plurality of server nodes (Step 166).

In one embodiment, a mapping is received at a server node from a system administrator or another user with administrative privileges (Step 150). The administrator configures a new mapping by editing a system database that specifies an association between a particular data file or type of data file and a particular executable program or type of executable program, as discussed above. In another embodiment, the administrator specifies an association between a type of data file, a program for establishing a connection with a server system, and executable program for processing the data file, and parameters for use by the executable program. In one embodiment, the administrator specifies the mapping by manually editing one or more data files or by using a graphical system administration tool.

In one embodiment, the server node provides this system database in a file to one or more client nodes either periodically or on an as-needed basis using push or pull techniques. In another embodiment, these mappings are sent as standalone data entries to client systems that receive and incorporate them into their own local system databases. In still another embodiment, the specified mapping is also replicated or synchronized against the mappings specified on other server nodes. This last functionality facilitates the configuration and maintenance of server nodes in a server farm configuration.

The server node provides the mapping to one or more client nodes (Step 154) that utilize it as described above. In one embodiment, the server also provides conditional execution rules to one or more client nodes (Step 158) for storage or evaluation as described above. Conditional rules are specified and distributed using the techniques used for the specification and distribution of file-type associations.

In operation, the server nodes receive requests to execute an executable program from one or more client nodes (Step 162). In one embodiment, the availability of one or more executable programs on the server node(s) is determined in part by identification or authentication indicia. Each file on the server node is directly or indirectly associated with indicia that define a user, a group of users, or a privilege level. The client node provides one or more indicia indicative of the user's identity or the user's privilege level to a master server node or to one or more individual server nodes. The server node(s) verify these indicia against the indicia associated with each executable program available for execution. If the provided indicia match the associated indicia, then the executable program is made available for execution to the client node. Attempts to execute an executable program with authentication indicia exceeding those provided by the client node can result in one or more of an error message display on the client node, an alarm message display on a server node, and a request to initiate execution of the executable program on the client node.

The server node services these requests by executing the identified programs (Step 166). When servicing a request to execute a program, the server may itself service the request or it may delegate or reassign the execution request to another server. This delegation facilitates license management and reissue by limiting the number of server licenses needed to serve a client pool. The server receiving the request may also assign the execution request to a computing cluster, enabling load and resource management among servers to better manage client demand.

In one embodiment, the server node also receives data associated with a particular data file identified on the client node (Step 170). Typically, this data is processed by the executable program as it executes on a server node or cluster as described above. In another embodiment, the server receives pointers or other references to a data file on the client node that the server utilizes to generate requests for data, e.g., sequential or random access requests, for transmission to the appropriate client node. In one embodiment, if a first server node delegates a program execution request to a second server node, then the first server node, if it receives data or data file references, may similarly delegate, reroute or retransmit the data or data file references to the second server node or another server node, as appropriate.

Typically the server node provides the application output data from the execution of the executable program to the client node for display to the end user, as described above (Step 174). Application output data may be provided in one or more formats supported either directly by the client node, or by an application program executing on the client node, e.g., a thin-client display application such as METAFRAME. Application output data may be a bitstream representative of graphical data, compressed or uncompressed; a markup language representative of vector graphics for display; text; or a series of system-dependent or API calls that when executed display the application output data on the client node for the user.

Server-Based FTA

Figure 9A:
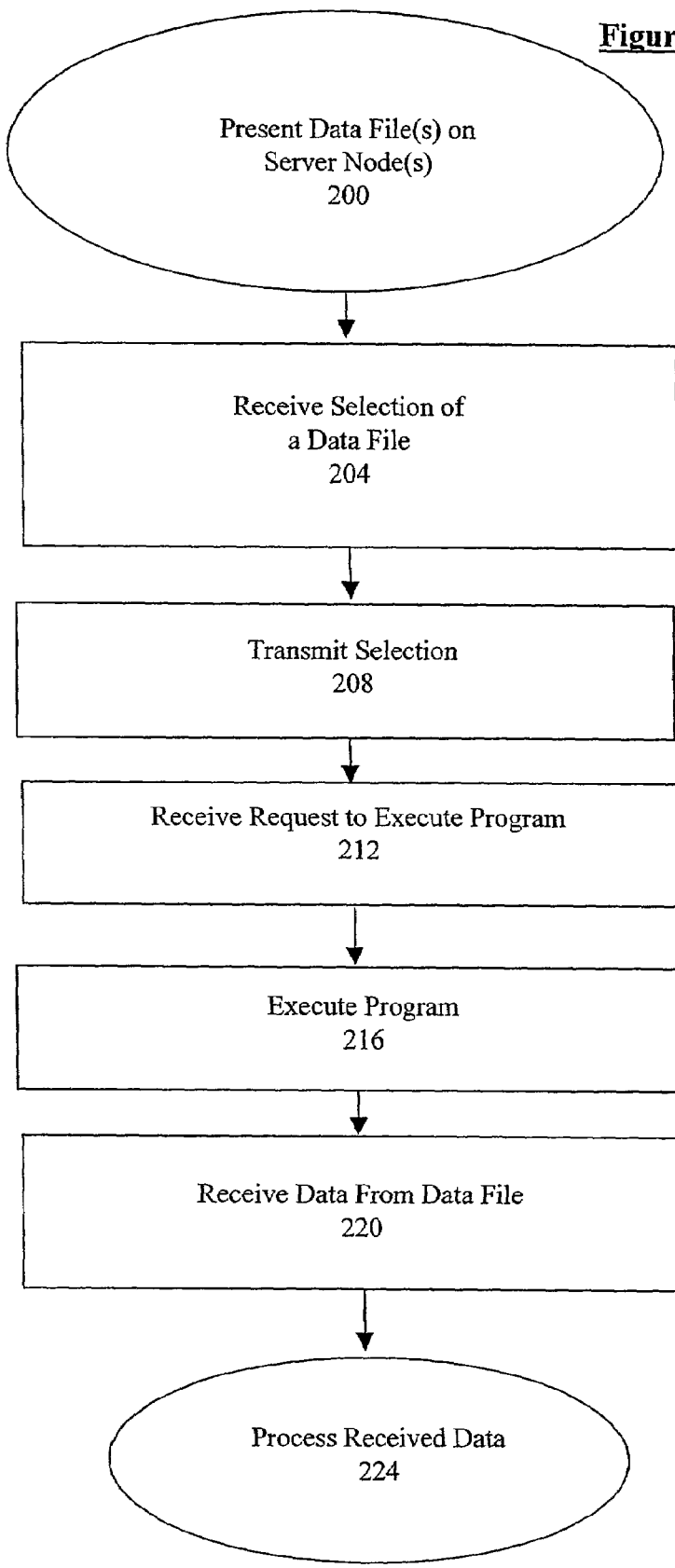
FIG. 9A is a flow chart representation of an embodiment of a process by which a user executes an application program on his or her client node by selecting a data file hosted by a server node.

Referring to FIG. 9A, in another embodiment the present invention enables transparent distributed program execution on a client node through the selection of graphical indicia representative of a data file located on a server node. The client node presents a graphical depiction of a data file stored on one of a plurality of server nodes (Step 200). The client node receives a selection of the graphical depiction of the data file (Step 204) and transmits the selection to one of the plurality of server nodes (Step 208). The client node receives a request from one of the plurality of server nodes to execute an executable program associated with the selected data file (Step 212) and executes the associated executable program (Step 216).

Still referring to FIG. 9A, the client node presents a user with a graphical depiction of at least one data file stored on at least one server node (Step 200). The graphical depiction of the data files includes but is not limited to the display of graphical indicia such as icons or the display of file names. In one embodiment, indicia representative of files stored on one or more server nodes are intermingled with indicia representative of files stored on the client node. In this embodiment, server-based FTA is operative when indicia representative of a file stored on a server node is selected. In another embodiment, multiple forms of FTA (see above, below) are operative, with the appropriate form of FTA activated based on the location of the file associated with the selected graphical indicia.

In one embodiment, functionality on the client node queries a master server node which aggregates information concerning the data files available on connected server nodes. The master server node presents an aggregated list of files available on the master server and connected servers and presents it to the client node using either push or pull mechanisms before presentation to the user. In another embodiment, functionality on the client node queries each individual server node concerning the availability of data files for server-side FTA before presenting available files to the user. In yet another embodiment, functionality on the client node (e.g., Network File System (NFS) or Andrew File System (AFS)) makes the files on one or more server nodes appear as part of the client node's file system. These files are subsequently presented to the user for use with server-based FTA.

In one embodiment, the availability of one or more files on the server node(s) is determined in part by identification or authentication indicia. Each file on the server node is directly or indirectly associated with indicia that define a user, a group of users, or a privilege level. The client node provides one or more indicia indicative of the user's identity or the user's privilege level to a master server node or to one or more individual server nodes. The server node(s) verify these indicia against the indicia of each file available for server-based FTA. If the provided indicia match the associated indicia, then the file is made available to the client node and graphically presented to the user for potential server-based FTA activities.

As described above, the user may select a data file by interacting with the displayed graphical indicia, typically using a graphical user interface and one or more input devices (Step 204). Once the user selects a data file, the selection is transmitted to one of the plurality of server systems (Step 208). In one embodiment, the selection is transmitted to a master server node. The master server node identifies the server node hosting the data file and provides the selection to the appropriate server node for further processing. In another embodiment, the selection is transmitted to one or more server nodes, either server nodes specifically associated with the selected data file or server nodes identified as generally available for server-based FTA. The latter behavior facilitates load-balanced file serving among servers through file mirroring and other advanced forms of data redundancy.

After providing the selection of the data file, a request to execute an executable program associated with the selected data file is received (Step 212). As discussed above, the request may come from a master server node, a server node hosting the selected data file, or a server node not hosting the selected data file. In response, the client node executes the executable program associated with the data file (Step 216).

In one embodiment, the client node receives data associated with the selected data file for processing by the executing program (Step 220). In another embodiment, the client node receives a pointer to the selected data file. The client node utilizes the provided pointer to generate one or more requests for data, e.g. sequential or random, which it provides to one or more server nodes for servicing by a master server node, a server node hosting the selected data file, or a server node not hosting the selected data as discussed above. In one embodiment, these requests are transmitted utilizing a protocol, such as hypertext transfer protocol (HTTP), secure HTTP (HTTPS) (i.e., using SSL), messaging application programming interface (MAPI) protocol, real-time streaming protocol (RTSP), real-time streaming protocol used for user datagram protocol scheme (RTSPU), the Progressive Networks Multimedia (PNM) protocol developed by RealNetworks, Inc. of Seattle, Wash., or manufacturing message specification (MMS) protocol.

Having received data associated with the selected data file, the client node typically processes the received data using the executing program (Step 224). The client node typically displays the result of the processing to the end user. In one embodiment, the processing and display cycle is iterative, with further control input from the user leading to further processing and display, leading in turn to further control input from the user, etc.

Figure 9B:
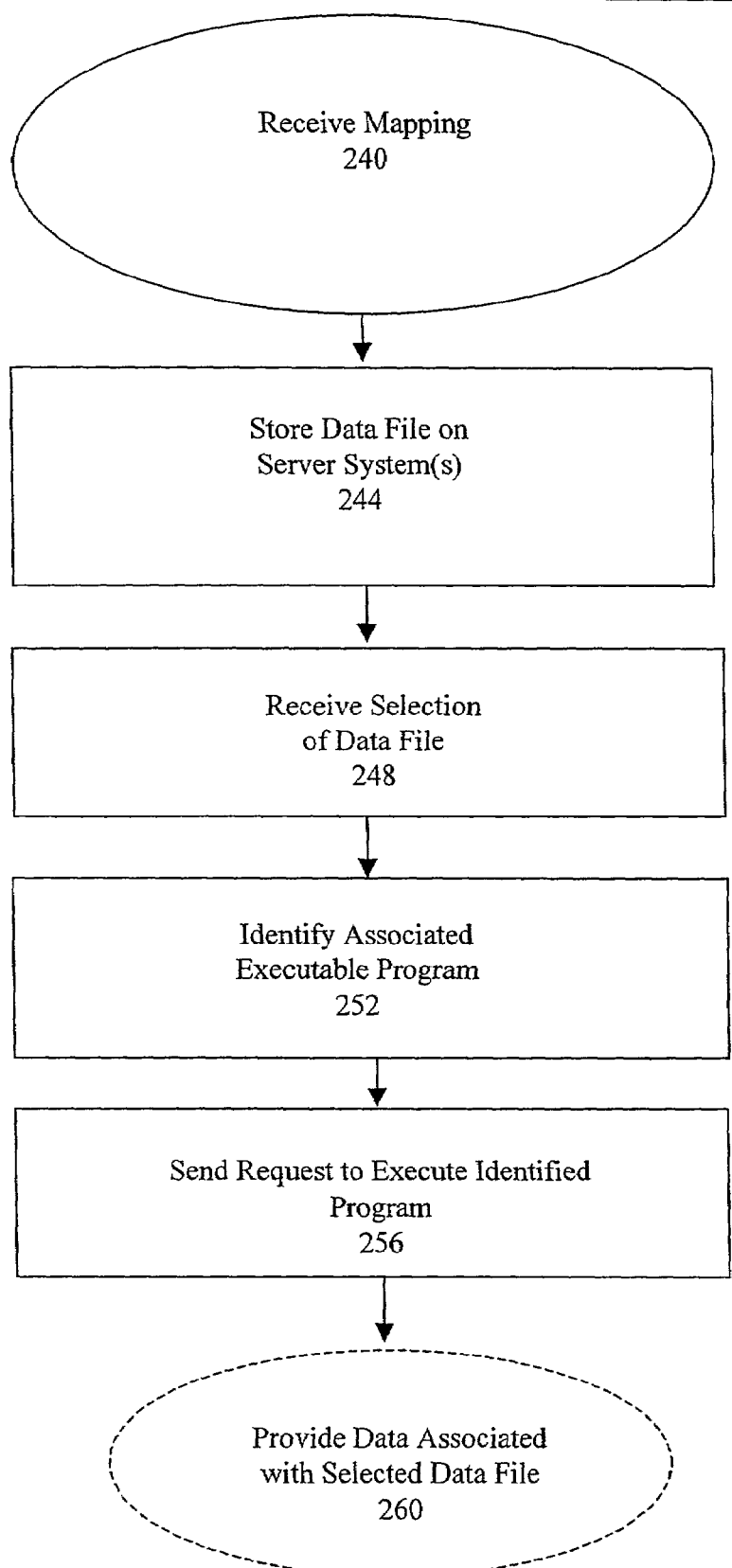
FIG. 9B is a flow chart representation of the role of the server node in the embodiment of FIG. 9A.

FIG. 9B illustrates the typical role of a server node in server-side FTA. A mapping is received that specifies an association between a type of data file and an executable program for execution on a client system (Step 240). A data file is stored on one of a plurality of server systems (Step 244). A selection of the stored data file is received by the server node (Step 248) and an executable program associated with the type of the selected data file is identified using the received mapping (Step 252). A request is sent to the client system to execute the identified executable program (Step 256).

The mapping received by the server node (Step 240) specifies an association between a data file and an executable program and, in this respect, is similar to the mapping utilized in client-based FTA. The mapping is different from the mapping used in client-based FTA in that it specifies an executable program for execution on the client node. For embodiments in which the application executes at the client node, the associated program is typically a standalone application and not a thin-client application that invokes the application of a second executable program.

However, in some embodiments, the client node receives the application execution request from the server node and, instead of executing the identified executable program (and thus executing the application), redirects the execution request to another server node. Thus, the server node to which the client node redirects the execution request is the node which executes the identified executable program. In the embodiments, the client-based FTA "overrides" the server-based FTA because the server node identified by the client-side mapping executes the application, not the node identified by the server-side mapping.

In one embodiment, the mapping is received as a standalone entry. In another embodiment, mappings are aggregated and presented in a group, or aggregated and transmitted with other data such as software updates. Mappings are provided over a live telecommunications link or stored in binary or text format on one or more removable storage media.

As discussed above, the mapping specifies a linkage between data files or executable programs at various levels of granularity. Particular mappings link particular data files or particular types of data files and particular executable programs or types of executable programs. Executable programs are identified by vendor name or by filename.

In one embodiment, the received mapping is incorporated in a file containing a system database that tracks associations between executable programs and data files or types of data files. In another embodiment, these mappings are updated on either a periodic or on an as-needed basis using push techniques, pull techniques, or a combination of the two.

In still another embodiment, the server system receives one or more rules for determining whether an identified associated executable program is to be executed on the client system or one of the plurality of server systems. These rules are functions of one or more variables including but not limited to the execution load on the client system, the execution load on one of the plurality of server systems, the execution load on the collective plurality of server systems, the speed of the connection between the client system and the plurality of server systems, or any combination of these or other factors.

In operation, one or more data files are stored on one or more server nodes (Step 244). Data files are provided to server nodes over a live telecommunications link or off-line using one or more forms of portable storage media. Data files are provided at a scheduled time, within a scheduled time window, or when the client node in question is idle or has a processor execution load below a certain predetermined level.

The server node receives a selection of graphical indicia representative of the stored data file (Step 248). When the selection is received, the server identifies any associated executable program or type of executable program identified in the received mapping (Step 252). A request to execute the identified executable program is transmitted to the client node for execution (Step 256).

In one embodiment, any associated rules are loaded and evaluated to determine whether the executable program is to execute on the client node, one of the plurality of server nodes, or several server nodes as in a distributed processing environment. If the evaluation of the rule indicates that execution is to occur on the client node, then a request to execute the associated executable program is transmitted to the client node (Step 256). In one embodiment, when the evaluation of a rule indicates that the associated executable program should execute on the client node, the client node provides the output of the executing program directly to the user, bypassing any thin-client application in operation on the client node.

In one embodiment, a server node provides data associated with the selected data file for processing (Step 260). Typically this information is processed by the executable program operating on the client node and the result is provided to the user, where further input cues further processing and display. In another embodiment, the server node provides a pointer or other reference to the selected data file. The client node generates requests for data, e.g., random or sequential, using the provided reference. The requests are transmitted to the server node, which services them by providing data in response to the request.

In yet another embodiment, services provided by a server node, e.g., servicing data requests or providing data associated with a selected file, are provided by a plurality of server nodes acting in concert, e.g., a server farm. In one embodiment a master server node receives requests for processing or data and services them directly. In another embodiment, the master server node delegates client requests to other server nodes. This technique facilitates balanced processing among server nodes. In yet another embodiment, requests are subdivided and distributed among several server nodes that handle processing or data access in parallel.

Web-Based FTA

Figure 10A:
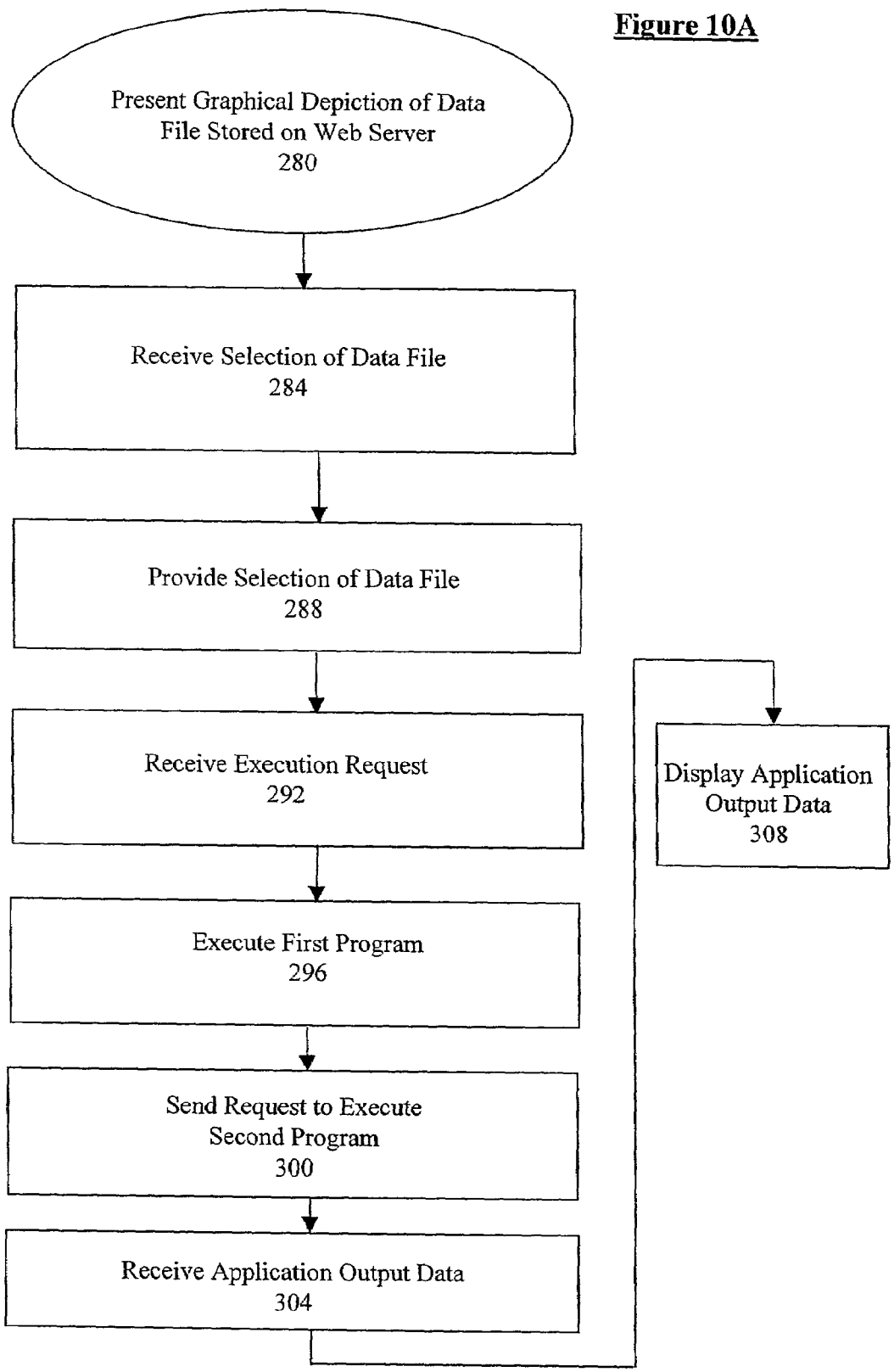
FIG. 10A is a flow chart representation of an embodiment of a process by which a user executes an application hosted by a server node by selecting a data file hosted by a web server.

Referring to FIG. 10A, in one embodiment the present invention enables transparent program execution on a server node through the selection of graphical indicia presented on a client node that are representative of data files located on a web server. The client node presents a graphical depiction of a data file stored on a web server (Step 280). The client node receives a selection of a graphical depiction of a data file (Step 284) and provides it to the web server (Step 288). The client node receives a request to execute a first executable program, the request including information concerning a second executable program associated with the data file for execution on one of the client system and one of a plurality of server systems (Step 292). The client node executes the first executable program (Step 296) and provides the request to execute the second executable program (Step 300). The client node receives application output data from the execution of the second executable program (Step 304) and displays it to the end user (Step 308).

Still referring to FIG. 10A, the client node presents a user with a graphical depiction of one or more data files stored on one or more web servers (Step 280). The graphical depiction of the data files includes but is not limited to the display of graphical indicia such as icons or the display of file names as hyperlinks in an SGML document. In one embodiment, indicia representative of files stored on web servers are intermingled with indicia representative of files stored on the client node or files stored on one or more server nodes. In this embodiment, web-based FTA operates when an icon representative of a file stored on a web server is selected. In another embodiment, multiple forms of FTA (see above) are operative, with the appropriate form of FTA activated based on the location of the file associated with the selected graphical indicia.

The client node receives the user's selection of a particular data file using a keyboard, a mouse, a light pen, a pressure-sensitive tablet, a haptic interface, or other input device (Step 284). The client node provides the selection to the web server (Step 288), typically using a telecommunications protocol such as HTTP.

In response to providing the selected data file, the client node receives an execution request (Step 292). The request includes several parameters including but not limited to a reference to a first executable program and a reference to a second executable program associated with the data file. In one embodiment, the executable programs are identified by vendor names or file names which are resolved by the client system into at least one of a file name, a path name, or a reference to the desired executable program. The request typically includes a parameter that identifies the selected data file on the web server, such as a Uniform Resource Locator (URL).

In one embodiment, an exemplary request is "MetaFrame MSWORD.EXE http://12.34.127.128/doc/VendorList. RTF." The first parameter is "MetaFrame," representative of the first executable program for execution on the client node, which the client node identifies as the executable program stored at "C: \PROGRA\~1\CITRIX\MF.EXE". The second parameter is "MSWORD.EXE," which refers to the second executable program for resolution and execution on a server node. The third parameter is "http://12.34.127.128/doc/VendorList.RTF" which identifies the file on the web server that the user had selected. In operation, the client node executes MetaFrame and forwards the request to execute WORD to a server node.

In further embodiments, the server node transmits a request which includes control information, such as a security token, to the client node. For example, the first executable program may include control information in the request to execute the second executable program on a server node. Thus, the control information may invoke a third program on the server node or web server upon receipt of a request to execute the second executable program (e.g., WORD). This third program could modify the manner of delivery of the application (e.g., require the user to provide appropriate authentication credentials, such as a password, before delivery, require the server node to wait for a key from another node before delivery of the application). In a further embodiment, the control information may provide a server node with an indicia to enable the server node to access a second executable program previously unaccessible by the server node.

In one embodiment, the selected file on the web server is received by the client node, which caches the file for editing. In this embodiment, the client node provides data associated with the file to the server node for processing by the executing program. In another embodiment, the client node provides a reference to the cached file to the server node. The server node uses the provided reference to generate requests for data which the client node services. In still another embodiment, the parameter identifying the selected data file is provided directly to the server node, which contacts the web site directly for data associated with the selected file or delegates the request to another server in a server farm.

The client node executes the first executable program (Step 296) which, in one embodiment, is a thin-client application like METAFRAME for receiving and displaying application output data to an end user. In one embodiment, the client node receives the first executable program from a server node or a web server using push techniques, pull techniques, or a combination thereof on either an as-needed or a scheduled basis.

The client node provides the request to execute the second executable program to a master server node, a server node, or a plurality of server nodes (Step 300). In one embodiment, a plurality of server nodes coordinate and share the execution task. This functionality permits the implementation of load balancing in a server farm or server array.

In one embodiment, the client node receives one or more rules for determining whether the second executable program is to be executed on the client system or one of the plurality of server systems. These rules are functions of one or more variables including but not limited to the execution load on the client system, the execution load on one of the plurality of server systems, the execution load on the collective plurality of server systems, the speed of the connection between the client system and the plurality of server systems, or any combination of these or other factors. In operation, any associated rules are loaded and evaluated to determine whether the second executable program is to execute on the client node, one of the plurality of server nodes, or several server nodes as in a distributed processing environment. In one embodiment, if the evaluation of the rule indicates that execution is to occur on the client node, the client node provides the output of the executing program directly to the user, bypassing any thin-client application in operation on the client node.

Upon execution, the associated application program will typically generate one or more forms of output data, including but not limited to graphical output data or sound. In one embodiment, the client node, through a connection with the server node, receives the application output data (Step 304) and displays it to the end user (Step 308). In one embodiment, application output data is provided in one or more formats supported either directly by the client node, or by the first executable program or another executable program executing on the client node. In another embodiment, application output data is one or more of a bitstream representative of graphical data, compressed or uncompressed; a markup language representative of vector graphics for display; text; or a series of system-dependent or API calls that when executed display the application output data on the client node for the user.

Figure 10B:
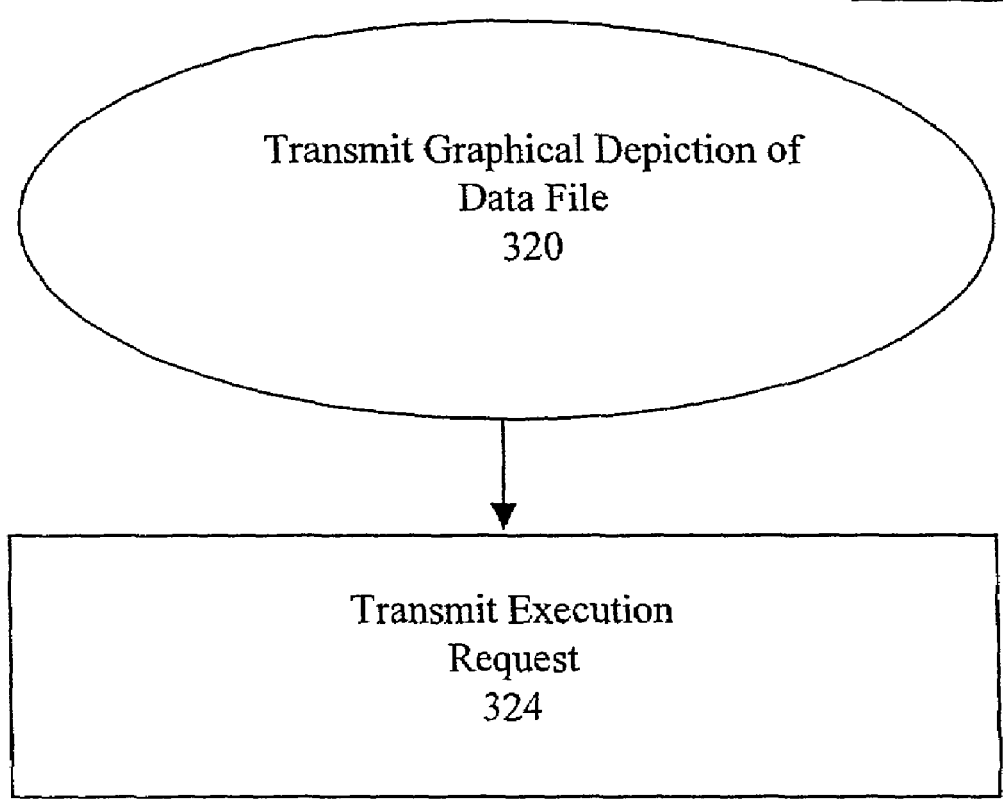
FIG. 10B is a flow chart representation of the role of the web server in the embodiment of FIG. 10A.

FIG. 10B illustrates the role of the web server in web-based FTA. The web server provides a graphical depiction of a data file (Step 320). The web server subsequently transmits an execution request to the client node (Step 324).

In one embodiment, the web server provides graphical indicia related to data files that it hosts that are available for selection by the end user (Step 320). In another embodiment, the web server determines which data files are available to the end user by comparing authentication or identity indicia against indicia associated with each hosted file. In still another embodiment, the web server prompts other connected server nodes or web servers to provide graphical indicia related to the files that they host which are accessible to the user, either aggregating the indicia and presenting them itself or leaving each individual server responsible for presentation.

The web server typically receives a selection of indicia associated with a presented file. In embodiments where the selected file is associated with a connected server, the receiving web server may either delegate the received selection to the appropriate server or retrieve the data associated with the selected file from the appropriate server, handling executable and data requests itself. In one embodiment, the choice between these options is made in accord with an evaluation designed to balance loads among servers.

In one embodiment, the web server receives individual mappings for incorporation into a data file for later use. In still another embodiment, the web server receives mappings in groups or aggregated with other data such as software updates. Mappings may be transmitted over live telecommunications links or stored in data files on one or more removable storage media. In one embodiment, these mappings are updated on either a periodic or on an as-needed basis using push techniques, pull techniques, or a combination of the two.

Utilizing the received mappings, the web server determines whether the selected data file is associated with an executable program for execution using web-based FTA mechanisms. The mappings typically specify an association between data files or executable programs at various levels of granularity. In one embodiment, mappings link particular data files or types of data files and particular executable programs or types of executable programs, identified either by vendor name or filename. In another embodiment, the mappings file also includes parameters related to user identity, including but not limited to one or more of a user name, a public key, and an IP address. This functionality permits the web server to maintain multiple sets of file-type associations that vary among individual users.

Using the received mapping information, the web server constructs and transmits an execution request to the client node (Step 324), which the client node subsequently executes as described above. In one embodiment, the web server also provides the first executable program to the client node for execution. In another embodiment, the web server also provides a reference to the selected data file that enables other computing nodes to formulate requests for data associated with the selected data file. In still another embodiment, the web server also services data requests from other computing nodes formulated using the provided reference. In still another embodiment, the server node provides the data associated with the selected data file to the client node or one of a plurality of server nodes to facilitate subsequent processing.

In still another embodiment, the web server also provides one or more rules to the client node that permits the client node to decide whether the second executable program should be executed on the client node, one of the plurality of server nodes, or a plurality of server nodes based on factors including but not limited to the load on the client system, the load on a particular server system, the load on the plurality of server systems, or the available or theoretical bandwidth of the connection between one or more of the client node, the web server, a server node, or the plurality of server nodes.

The present invention may be provided as one or more computer-readable programs embodied on or in one or more articles of manufacture. The article of manufacture may be a floppy disk, a hard disk, a CD ROM, a flash memory card, a PROM, a RAM, a ROM, or a magnetic tape. In general, the computer-readable programs may be implemented in any programming language. Some examples of languages that can be used include C, C++, or JAVA. The software programs may be stored on or in one or more articles of manufacture as object code.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. In a network including a client system and a plurality of server systems, a method for enabling distributed program execution, the method comprising the steps:
    (a) receiving at a client system, from one of a plurality of server systems, a mapping specifying an association between a plurality of executable application programs and a corresponding plurality of types of data files accepted for processing by the executable application programs;
    (b) presenting, by the client system, a graphical depiction of a data file stored on a client system;
    (c) receiving, by the client system, a selection of the graphical depiction of the data file;
    (d) identifying, by the client system, one of the plurality of executable application programs associated with the type of file identified by the selected graphical depiction using the received mapping; and
    (e) sending, by the client system, to one of the plurality of server systems a request to execute the identified one of the plurality of executable application program.

2. The method of claim 1 wherein step (a) comprises receiving a mapping specifying an association between a plurality of types of data files, a program for establishing a connection with a server system, corresponding plurality of executable programs for processing the data file, and parameters for use by the executable programs.

3. The method of claim 1 further comprising the step:
    modifying a file on the client system to include the received mapping.

4. The method of claim 1 further comprising the step:
executing a second executable program for displaying application output data.

5. The method of claim 1 further comprising the step:
receiving application output data from the executing program.

6. The method of claim 1 further comprising the step:
updating the received mapping on at least one of a periodic basis and an as-needed basis.

7. The method of claim 1 further comprising the step:
receiving a rule determining whether an identified executable program is to be executed on the client system or one of the plurality of server systems.

8. The method of claim 1 further comprising the step:
receiving a rule for determining whether an identified executable program is to be executed on the client system or one of the plurality of server systems that specifies the determination between the client system and one of the plurality of server systems as a function of at least one of the load on the client system, the load on one of the plurality of server systems, the load on the plurality of server systems, and the speed of the connection between the client system and the plurality of server systems.

9. The method of claim 1 wherein step (e) comprises the steps:
(e-a) receiving a rule determining whether an identified executable program is to be executed on the client system or one of the plurality of server systems;
(e-b) evaluating the rule to determine whether the identified executable program is to be executed on the client system or one of the plurality of server systems; and
(e-c) sending a request to execute the identified executable program on one of the plurality of sewer systems based on the evaluation in step (e-b).

10. The method of claim 1 wherein step (e) comprises the steps:
(e-a) receiving a rule for determining whether an identified executable program is to be executed on the client system or one of the plurality of server systems tat specifies the determination between the client system and one of the plurality of server systems as a function of at least one of the load on the client system, the load on one of the plurality of server systems, the load on the plurality of server systems, and the speed of the connection between the client system and the plurality of server systems;
(e-b) evaluating the rule to determine whether the identified executable program is to be executed on the client system or one of the plurality of server systems; and
(e-c) sending a request to execute the identified executable program on one of the plurality of server systems based on the evaluation in step (e-a).

11. The method of claim 1 further comprising the step:
(f) transmitting data comprising the selected data file, at least some of the data for processing by the executing program.

12. The method of claim 11 wherein step (f) comprises the steps:
(f-a) providing a pointer to the selected data tile; and
(f-b) responding to requests for data associated with the selected data file utilizing the provided pointer.

13. The method of claim 1 further comprising the step of executing a second executable program for displaying application output data, the second executable program receiving the application output data via a presentation level protocol.

14. The method of claim 1 further comprising the step of executing a second executable program for displaying application output data, the second executable program receiving the application output data via an Independent Computing Architecture protocol.

15. The method of claim 1 further comprising the step of executing a second executable program for displaying application output data, the second executable program receiving the application output data via a Remote Desktop Protocol.

16. In a network including a client system and a plurality of server systems, a method for enabling distributed program execution, the method comprising the steps:
(a) transmitting to a client system a mapping specifying an association between a plurality of executable application programs and a corresponding plurality of types of data files accepted for processing by the executable application programs;
(b) receiving a request to execute one of the plurality of executable application programs; and
(c) executing the requested one of the plurality of executable application programs on one of a plurality of server systems.

17. The method of claim 16 wherein step (a) comprises providing a mapping specifying an association between a plurality of types of data files, a program for establishing a connection with a server system, a corresponding plurality of executable programs for processing the data file, and parameters for use by the executable programs.

18. The method of claim 16 further comprising the step:
providing application output data from the server system executing the executable program to a client system.

19. The method of claim 16 further comprising the step:
providing a second application for displaying application output data from the server system executing the executable program.

20. The method of claim 16 further comprising the step:
updating the provided mapping on at least one of a periodic basis and an as-needed basis.

21. The method of claim 16 further comprising the step:
(d) receiving data associated with a data file for processing by the executing program.

22. The method of claim 21 wherein step (d) comprises the steps:
(d-a) receiving a pointer to the data file; and
(d-b) sending requests for data associated with the data file utilizing the received pointer.

23. The method of claim 21 further comprising the step:
processing the received data using the executable program.

24. The method of claim 23 further comprising the step:
providing the processed data.

25. The method of claim 16 further comprising the step:
providing a rule to determine whether an executable program is to be executed on a client system or one of a plurality of server systems.

26. The method of claim 16 further comprising the step:
providing a file for determining whether an executable program is to be executed on the client system or one of the plurality of server systems that specifies the determination between the client system and one of the plurality of server systems as a function of at least one of the load on the client system, the load on one of the plurality of server systems, the load on the plurality of server systems, and the speed of the connection between the client system and the plurality of server systems.

27. The method of claim 16 further comprising the step of providing a second application for displaying application output data from the sewer system executing the executable program, the second application receiving the application output data via an Independent Computing Architecture protocol.

28. The method of claim 16 further comprising the step of providing a second application for displaying application output data from the server system executing the executable program, the second application receiving the application output data via a Remote Desktop Protocol.

29. In a network including a client system and a plurality of server
   systems, a method for enabling distributed program execution, the method comprising the steps:
   (a) receiving, by the client system, a mapping specifying an association between a plurality of executable application programs and a corresponding plurality of types of data files accepted for processing by the executable application programs;
   (b) presenting, by the client system, a graphical depiction of a data file stored on the client system;
   (c) receiving, by the client system, a selection of the graphical depiction of the data file;
   (d) identifying, by the client system, one of the plurality of executable application programs associated with the type of file identified by the selected graphical depiction using the received mapping; and
   (e) sending, by the client system, to one of the plurality of server systems a request to execute the identified one of the plurality of executable application program to one of a plurality of server systems.

30. The method of claim 29 wherein step (a) comprises receiving a mapping specifying an association between a plurality of types of data files, a program for establishing a connection with a server system, a corresponding plurality of executable programs for processing the data file, and parameters for use by the executable programs.

31. The method of claim 29 further comprising the step: modifying, by the client system, a file to include the received mapping.

32. The method of claim 29 further comprising the step: providing, to the client system, a second executable program for displaying application output.

33. The method of claim 29 further comprising the step: updating, by one of the plurality of server systems, the received mapping on at least one of a periodic basis and an as-needed basis.

34. The method of claim 29 further comprising the step executing, by one of a plurality of server systems, the executable program.

35. The method of claim 34 further comprising the step: providing, by the server system executing the executable program, application output data.

36. The method of claim 29 further comprising the step:
   (f) transmitting, by the client system, data comprising the selected data file, at least some of the data for processing by the executing program.

37. The method of claim 36 wherein step (f) comprises the steps:
   (f-a) providing, by the client system, a pointer to the selected data file; and
   (f-b) responding, by the client system, to requests for data associated with the selected data file utilizing the provided pointer.

38. The method of claim 36 further comprising the step: processing, by one of the plurality of server systems, the provided data using the executable program.

39. The method of claim 38 further comprising the step: providing, by one of the plurality of server systems, the processed data.

40. The method of claim 29 further comprising the step: receiving, at the client system, a rule determining whether an identified executable program is to be executed on the client system or one of the plurality of server systems.

41. The method of claim 29 further comprising the step: receiving, at the client system, a rule for determining whether an identified executable program is to be executed on the client system or one of the plurality of server systems that specifies the determination between the client system and one of the plurality of server systems as a function of at least one of the load on the client system, the load on one of the plurality of server systems, the load on the plurality of server systems, and the speed of the connection between the client system and the plurality of server systems.

42. The method of claim 29 wherein step (e) comprises the steps:
   (c-a) receiving a file determining whether an identified executable program is to be executed on the client system or one of the plurality of server systems;
   (c-b) evaluating a rule to determine whether the identified executable program is to be executed on the client system or one of the plurality of server systems; and
   (e-c) sending a request to execute the identified executable program on one of the plurality of server systems based on the evaluation in step (e-a).

43. The method of claim 29 wherein step (e) comprises the steps:
   (e-a) receiving, at the client system, a rule for determining whether an identified executable program is to be executed on the client system or one of the plurality of server systems that specifies the determination between the client system and one of the plurality a server systems as a function of at least one of the load on the client system, the load on one of the plurality of server systems, the load on the plurality of server systems, and the speed the connection between the client system and the plurality of server systems;
   (e-b) evaluating the received rule to determine whether the identified executable program is to be executed on the client system or one of the plurality of server systems; and
   (e-c) sending a request to execute the identified executable program on one of the plurality of server systems based on the evaluation in step (e-a).

44. The method of claim 29 further comprising the step of executing a second executable program for displaying application output data, the second executable program receiving the application output data via a presentation level protocol.

45. The method of claim 29 further comprising the step of executing a second executable program for displaying application output data the second executable program receiving the application output data via an Independent Computing Architecture protocol.

46. The method of claim 29 further comprising the step of executing a second executable program for displaying application output data, the second executable program receiving the application output data via a Remote Desktop Protocol.

* * * * *